US010717355B2

(12) United States Patent
Dudar

(10) Patent No.: US 10,717,355 B2
(45) Date of Patent: Jul. 21, 2020

(54) SYSTEMS AND METHODS FOR FUEL TANK GRADE VENT VALVE DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 16/226,434

(22) Filed: Dec. 19, 2018

(65) Prior Publication Data

US 2020/0198461 A1  Jun. 25, 2020

(51) Int. Cl.
 *B60K 15/035* (2006.01)
 *G06F 17/00* (2019.01)
 *B60K 15/03* (2006.01)

(52) U.S. Cl.
CPC .. *B60K 15/03519* (2013.01); *B60K 15/03504* (2013.01); *B60K 2015/0321* (2013.01); *B60K 2015/03197* (2013.01); *B60K 2015/03514* (2013.01)

(58) Field of Classification Search
CPC ............... F02D 19/025; F02D 19/0623; F02D 2250/02; F02M 25/08; F02M 25/0836; F02M 25/0872; F02M 55/007
USPC ................ 123/516, 518, 520; 701/101, 114; 73/114.38, 114.39, 114.43
See application file for complete search history.

(56) References Cited

U.S. PATENT DOCUMENTS

| | | | |
|---|---|---|---|
| 7,162,914 B2 | 1/2007 | Streib et al. | |
| 7,350,512 B1 | 4/2008 | Meacham et al. | |
| 9,341,147 B2 | 5/2016 | Jentz et al. | |
| 2014/0069394 A1 | 3/2014 | Jentz et al. | |
| 2015/0075267 A1 | 3/2015 | Sweppy et al. | |
| 2017/0114733 A1* | 4/2017 | Aghili | F02M 25/0854 |
| 2017/0145963 A1* | 5/2017 | Dudar | B60K 15/03504 |
| 2017/0198662 A1* | 7/2017 | Dudar | F02D 41/0042 |
| 2017/0292476 A1* | 10/2017 | Dudar | F02M 25/089 |
| 2017/0356360 A1* | 12/2017 | Dudar | F02D 41/22 |
| 2018/0017430 A1* | 1/2018 | Aghili | G01F 25/0061 |
| 2018/0066595 A1* | 3/2018 | Dudar | F02D 41/0037 |
| 2019/0040822 A1* | 2/2019 | Dudar | F02M 25/0827 |
| 2019/0108693 A1* | 4/2019 | Dudar | B60K 15/03177 |
| 2019/0249622 A1* | 8/2019 | Dudar | F02M 37/0082 |
| 2019/0271273 A1* | 9/2019 | Dudar | B60K 15/03519 |
| 2019/0383246 A1* | 12/2019 | Dudar | F02M 26/16 |

FOREIGN PATENT DOCUMENTS

WO  2016049320 A1  3/2016

* cited by examiner

*Primary Examiner* — John Kwon
(74) *Attorney, Agent, or Firm* — Geoffrey Brumbaugh McCoy Russell LLP

(57) ABSTRACT

Methods and systems are provided for inferring a current operational state of one or more fuel tank grade vent valves. In one example, a method comprises predicting an upcoming fuel slosh event in a fuel tank positioned in a fuel system of a vehicle, and in response to such a prediction, sealing the fuel system within a threshold duration of the upcoming fuel slosh event and diagnosing a grade vent valve as a function of fuel level in the tank at the time of the fuel slosh event and a pressure monitored in the fuel system during the fuel slosh event. In this way, issues related to fuel tank overpressurization and/or release of undesired evaporative emissions to atmosphere may be reduced or avoided.

20 Claims, 12 Drawing Sheets

SYSTEMS AND METHODS FOR FUEL TANK GRADE VENT VALVE DIAGNOSTICS

FIELD

The present description relates generally to methods and systems for inferring whether one or more grade vent valves of a fuel tank are functioning as desired or expected.

BACKGROUND/SUMMARY

Fuel tanks configured to store and provide fuel to an engine of a vehicle may be equipped with one or more passive valves. For example, a fuel tank may include a fuel limit vent valve (FLVV), which may comprise a mechanical float valve which can adopt an open configuration when a fuel level in the fuel tank is below a target fuel fill level of the tank, but which may close upon the fuel level reaching or exceeding the target fuel fill level. Such a fuel tank may additionally include two or more grade vent valves (GVVs), which may ensure that the fuel tank is vented at any given incline of the fuel tank. For example, at a particular incline one GVV may passively close to prevent liquid fuel from entering into lines coupling the fuel tank to an evaporative emissions control system, while another GVV may be maintained open to allow communication with the evaporative emissions system, which may prevent buildup of undesired levels of fuel tank pressure.

GVVs may in some examples become stuck in an open state, or a closed state. If a GVV becomes stuck in an open state, then during vehicle accelerations and/or decelerations, liquid fuel may enter into the lines coupling the fuel tank to the evaporative emissions system, and may potentially reach a fuel vapor storage canister positioned in the evaporative emissions system. Such fuel vapor storage canisters may be configured to trap and store fuel tank fuel vapors, before the vapors are purged to the engine for combustion. However, liquid fuel that enters the canister may corrupt the adsorbent material (e.g. activated carbon) therein, which may degrade canister function and which may lead to an increase in the release of undesired evaporative emissions to atmosphere over time. Alternatively, a stuck closed GVV may in some examples result in undesirable pressure buildup in the fuel tank. Accordingly, there is a need to provide onboard diagnostics capable of periodically evaluating whether one or more of the GVVs are degraded (e.g. stuck open or stuck closed), such that mitigating action may be taken to ensure fuel tank integrity is maintained and/or release of undesired amounts of evaporative emissions to atmosphere is reduced or avoided.

The inventors herein have recognized the above-mentioned issues, and have developed systems and methods to address them. In one example, a method comprises predicting an upcoming fuel slosh event in a fuel tank positioned in a fuel system of a vehicle, sealing the fuel system within a threshold duration of the upcoming fuel slosh event, and diagnosing a first or a second grade vent valve coupled to the fuel tank as a function of a fuel level in the fuel tank and a pressure monitored in the fuel system during the fuel slosh event. In this way, fuel tank grade vent valves may be regularly diagnosed as to current operational state, via onboard diagnostics under control of a vehicle controller. Such diagnostics may reduce potential for fuel tank overpressurization events and/or may reduce potential release of undesired evaporative emissions to atmosphere.

As an example, the method may include diagnosing the first grade vent valve under conditions where the fuel level in the fuel tank is lower than a first fuel level threshold but greater than a second fuel level threshold, and may further include diagnosing the second grade vent valve under conditions where the fuel level in the fuel tank is greater than or equal to the first fuel level threshold. In this way, diagnostics for the first grade vent valve and the second grade vent valve may be conducted in such a way as to provide robust results pertaining to whether either the first grade vent valve or the second grade vent valve are functioning as desired or expected.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
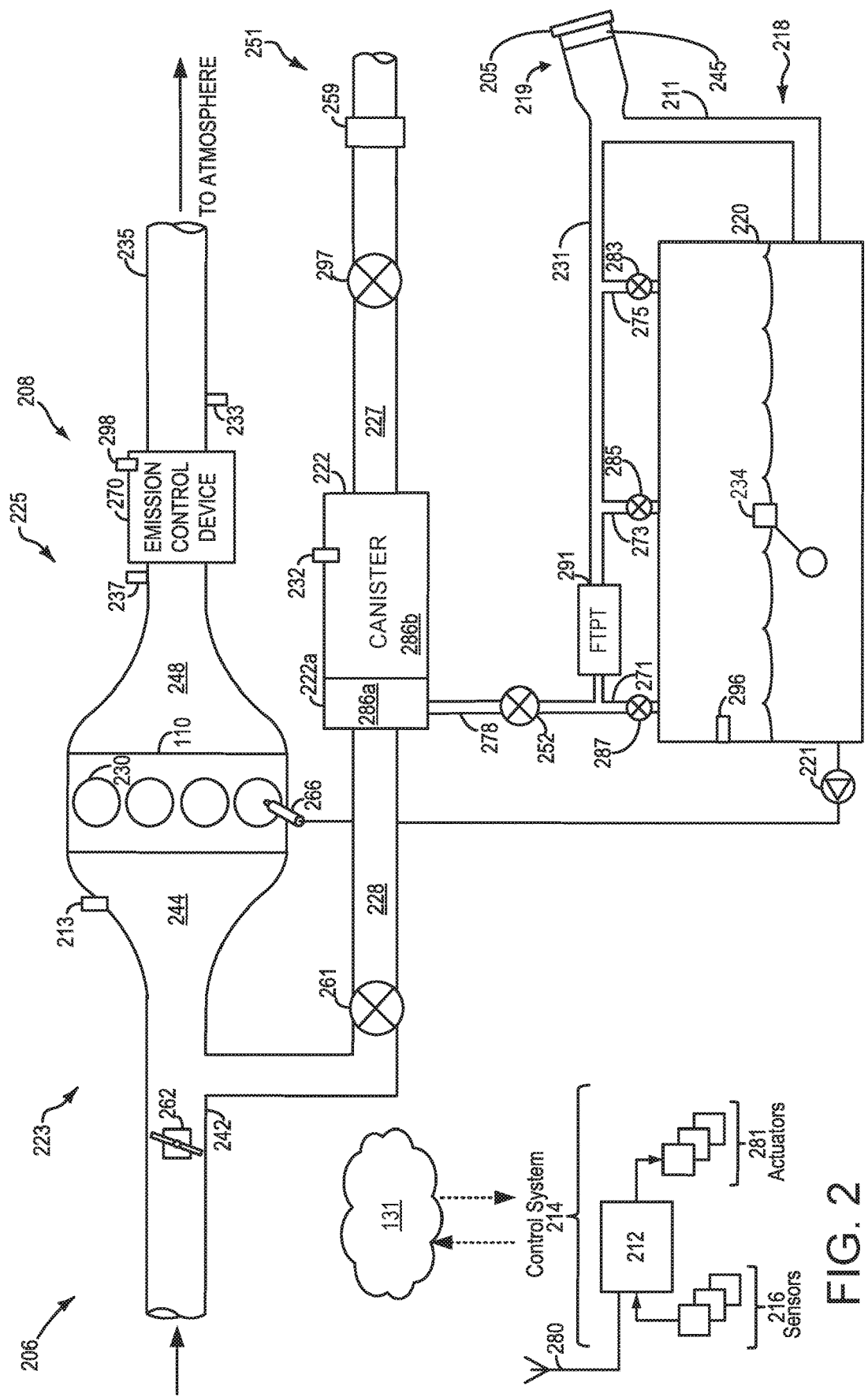
FIG. 2 schematically shows an example vehicle system with a fuel system and an evaporative emissions system.
Figure 3:
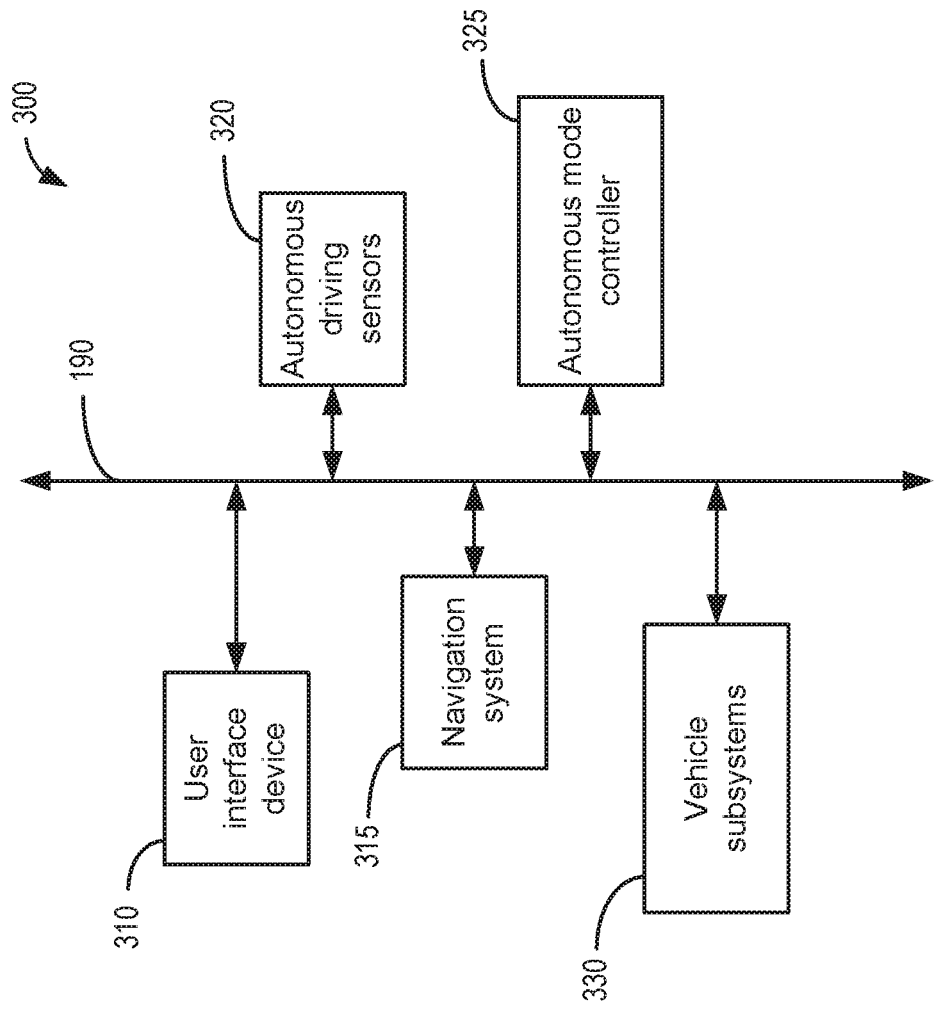
FIG. 3 schematically illustrates a block diagram of an example system for an autonomous vehicle.
Figure 4:
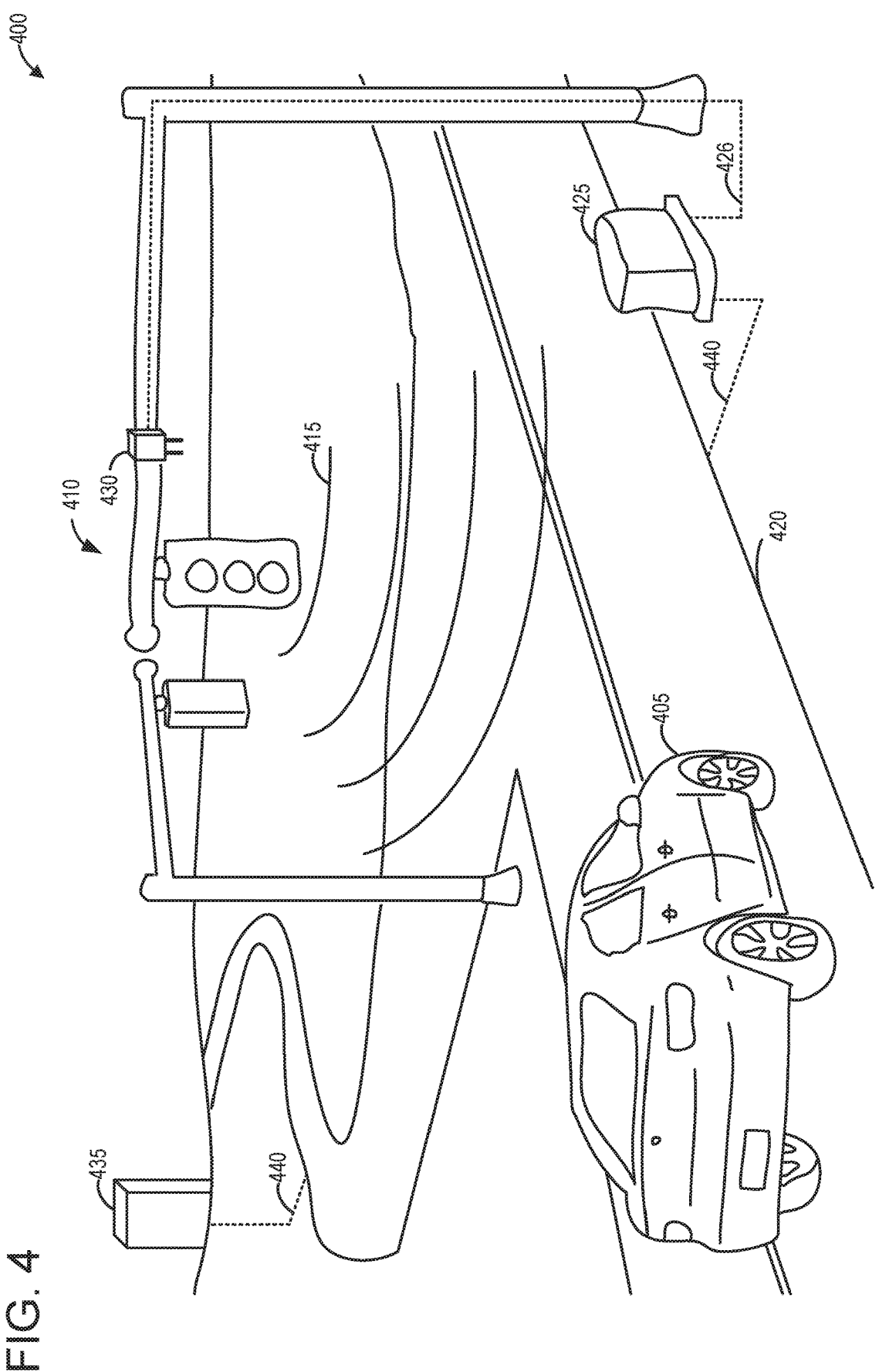
FIG. 4 schematically depicts an example of a smart traffic light system.

The following description relates to systems and methods for diagnosing current operational state of one or more fuel tank grade vent valves (GVVs), for example whether a grade vent valve is functioning as desired or expected, is stuck open, or is stuck closed. The systems and methods may apply to hybrid electric vehicles, such as the hybrid electric vehicle system depicted at FIG. 1. The GVVs may be coupled to a fuel tank that is fluidically coupled (in some examples via a valve means) to an evaporative emissions control system, the evaporative emissions system selectively fluidically coupled to an engine system and to atmosphere, as depicted at FIG. 2. The systems and methods may apply to vehicles that operate autonomously, such as the autonomous vehicle system depicted at FIG. 3. The vehicle for which GVV diagnostics are performed may in some examples include a controller that is in wireless communication with a smart traffic light, as depicted at FIG. 4.

Figure 5:
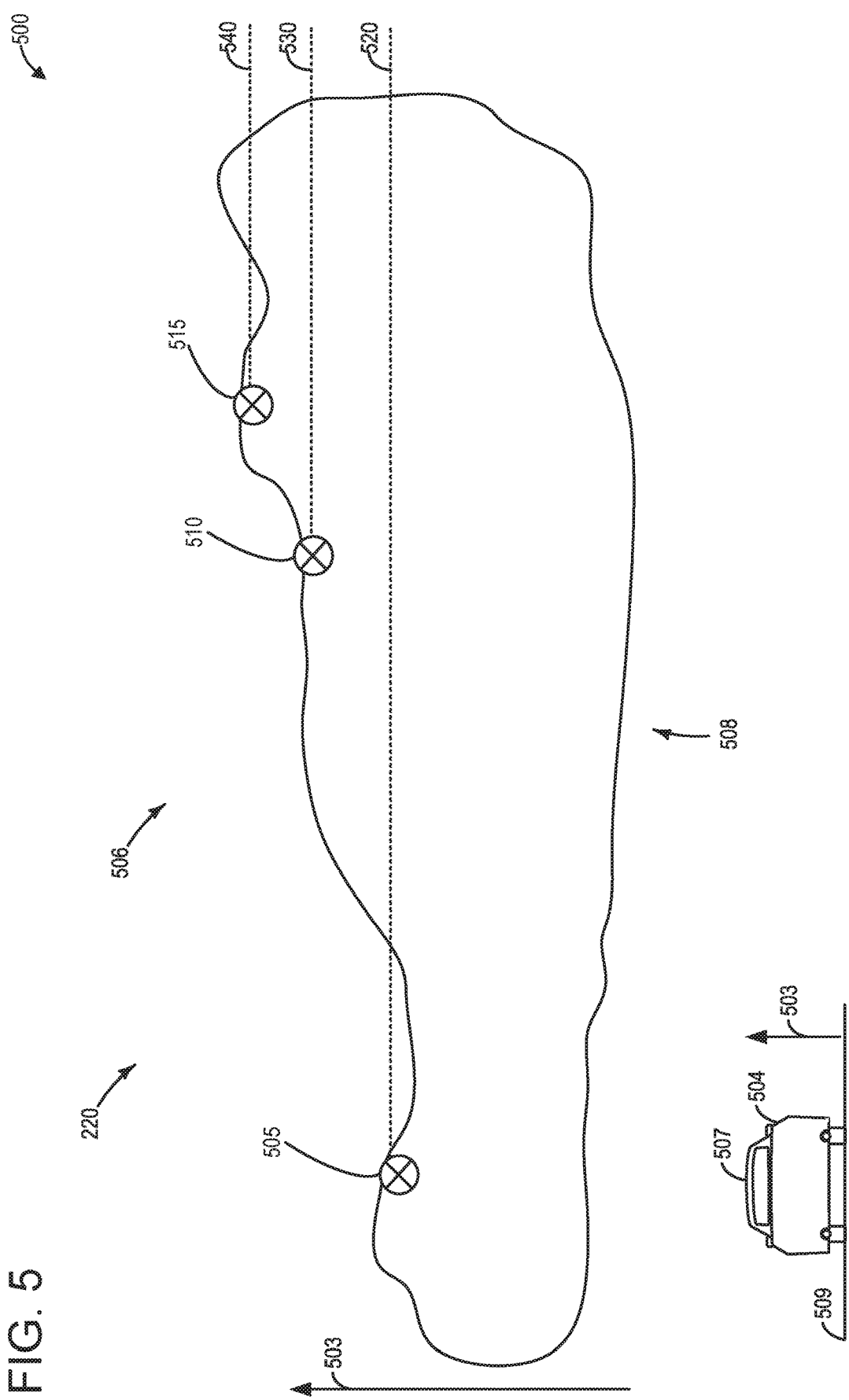
FIG. 5 depicts an example illustration of a fuel tank with a non-uniform height.
Figure 6A:
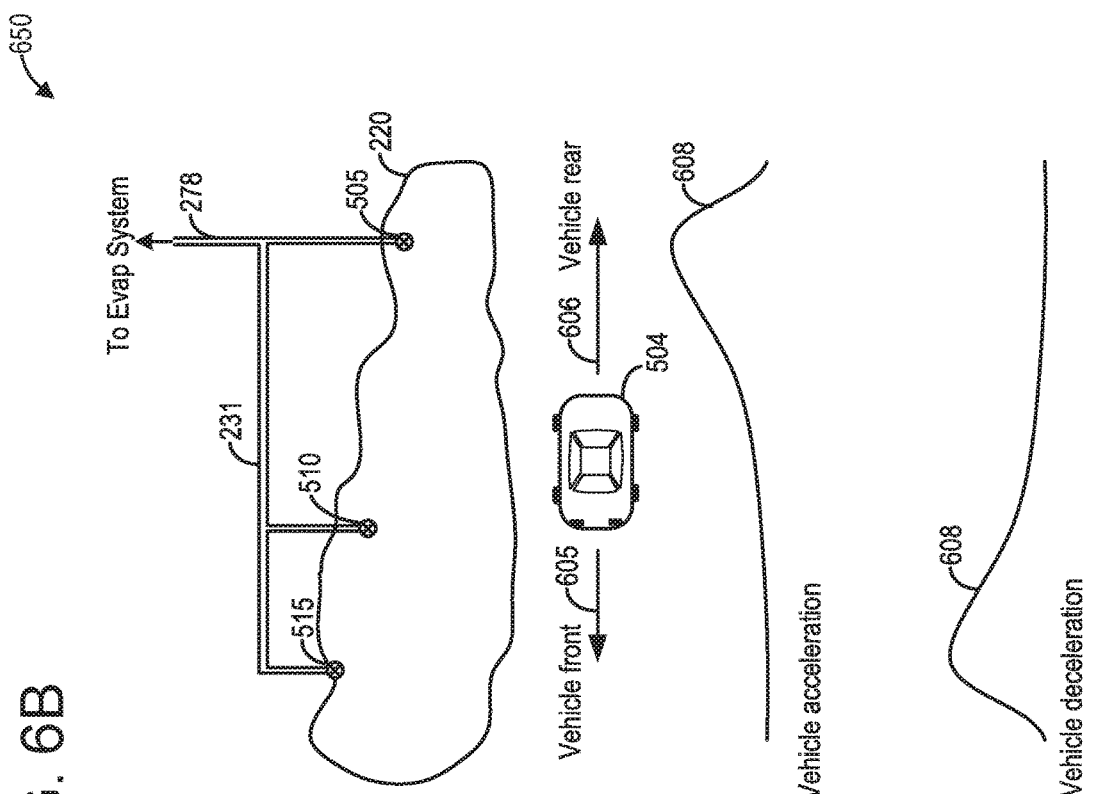
FIGS. 6A-6B depict example scenarios of fuel tank slosh in a fuel tank in response to vehicle acceleration and deceleration events.
Figure 6B:
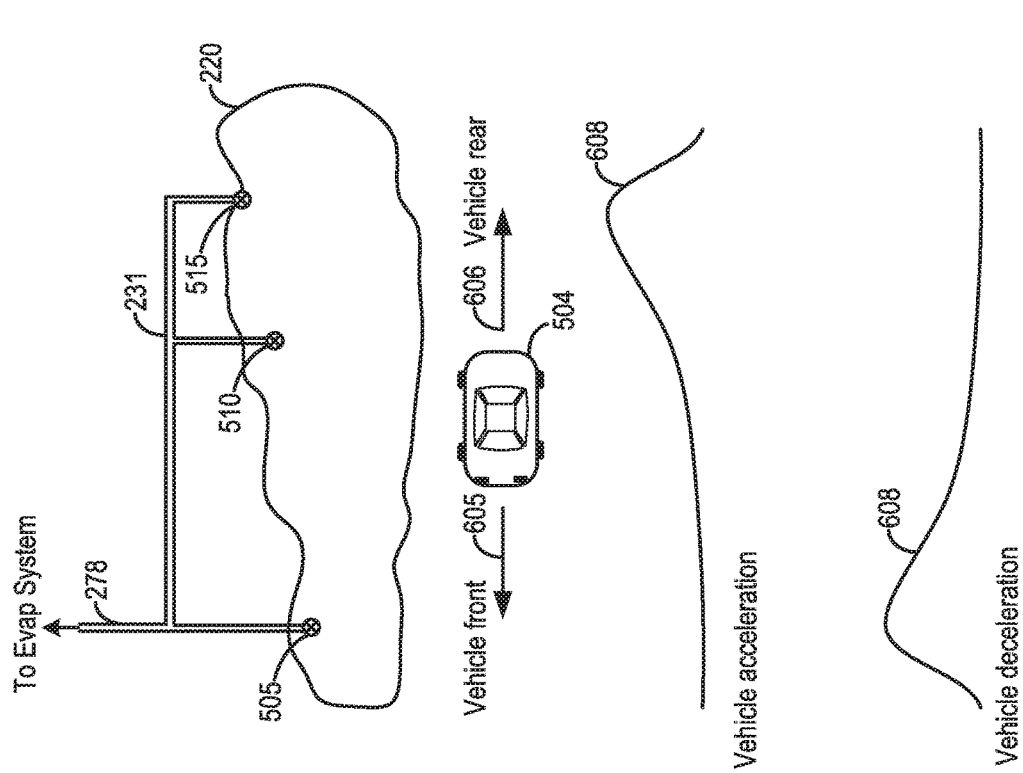
Figure 7A:
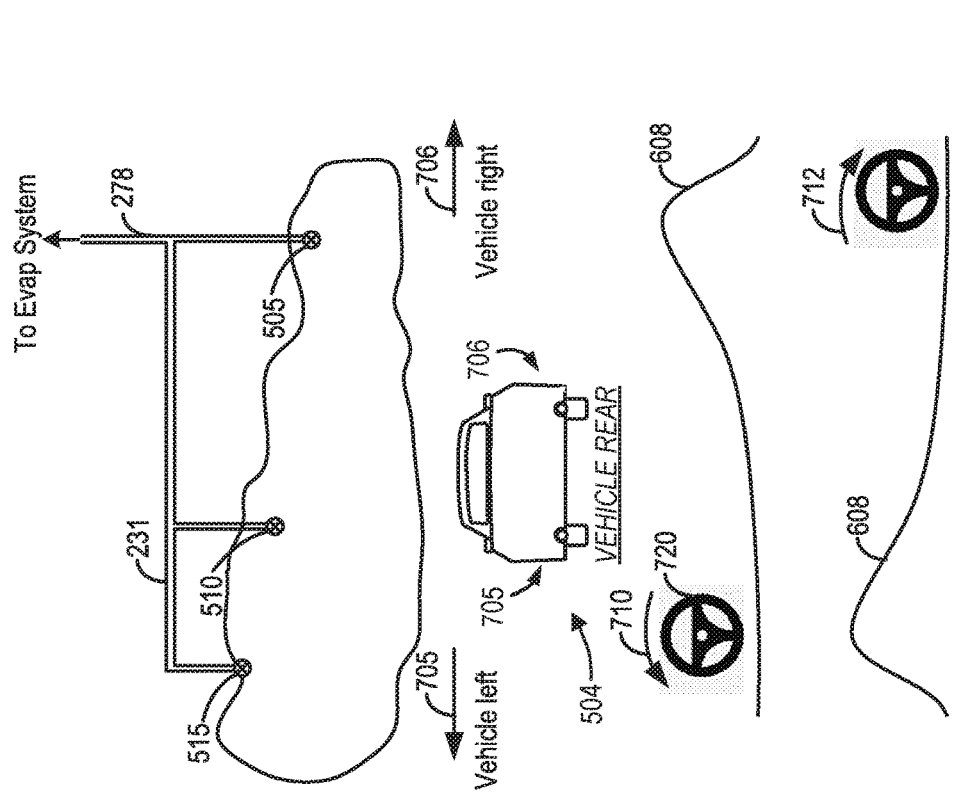
FIGS. 7A-7B depict example scenarios of fuel tank slosh in a fuel tank in response to vehicle turning operations.
Figure 7B:
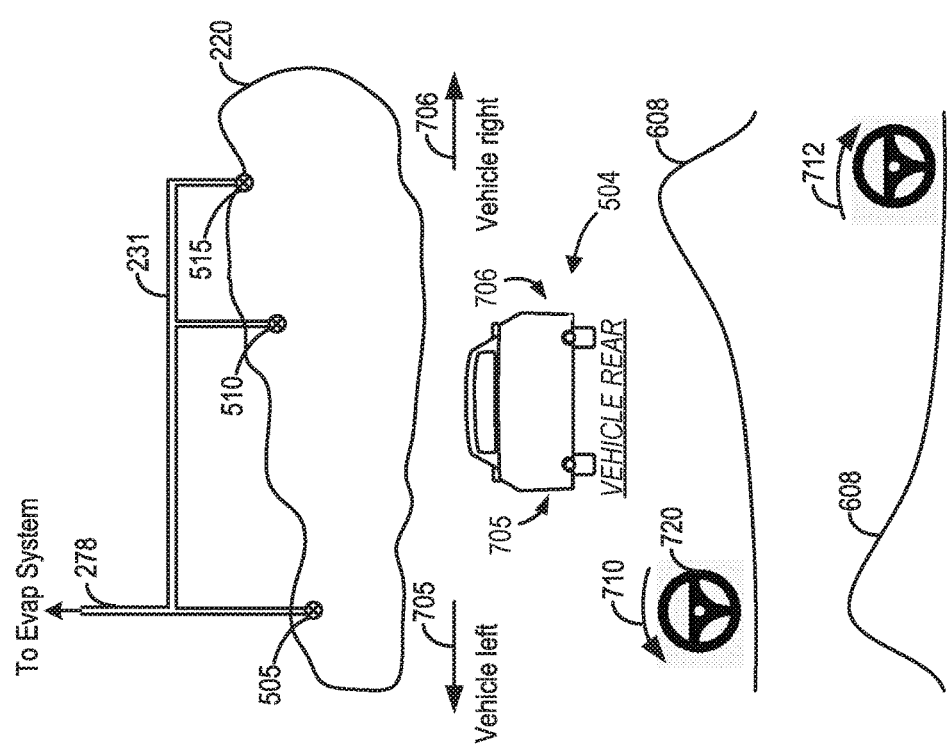

For conducting such GVV diagnostics, the GVVs may be positioned at different heights (e.g. GVV1 positioned at a lower height than GVV2) with respect to a maximal height of the fuel tank, such as depicted at FIG. 5. Briefly, the GVV diagnostics may involve fuel slosh event(s) where, depending on a fuel level in the tank at the time of the fuel slosh event(s), differential determination as to GVV functionality may be possible. Accordingly, FIGS. 6A-6B depict fuel slosh events in response to acceleration/deceleration events when the fuel tank is oriented as depicted therein. Alternatively, FIGS. 7A-7B depict fuel slosh events in response to vehicle turning maneuvers, when the fuel tank is oriented as depicted therein.

Figure 8:
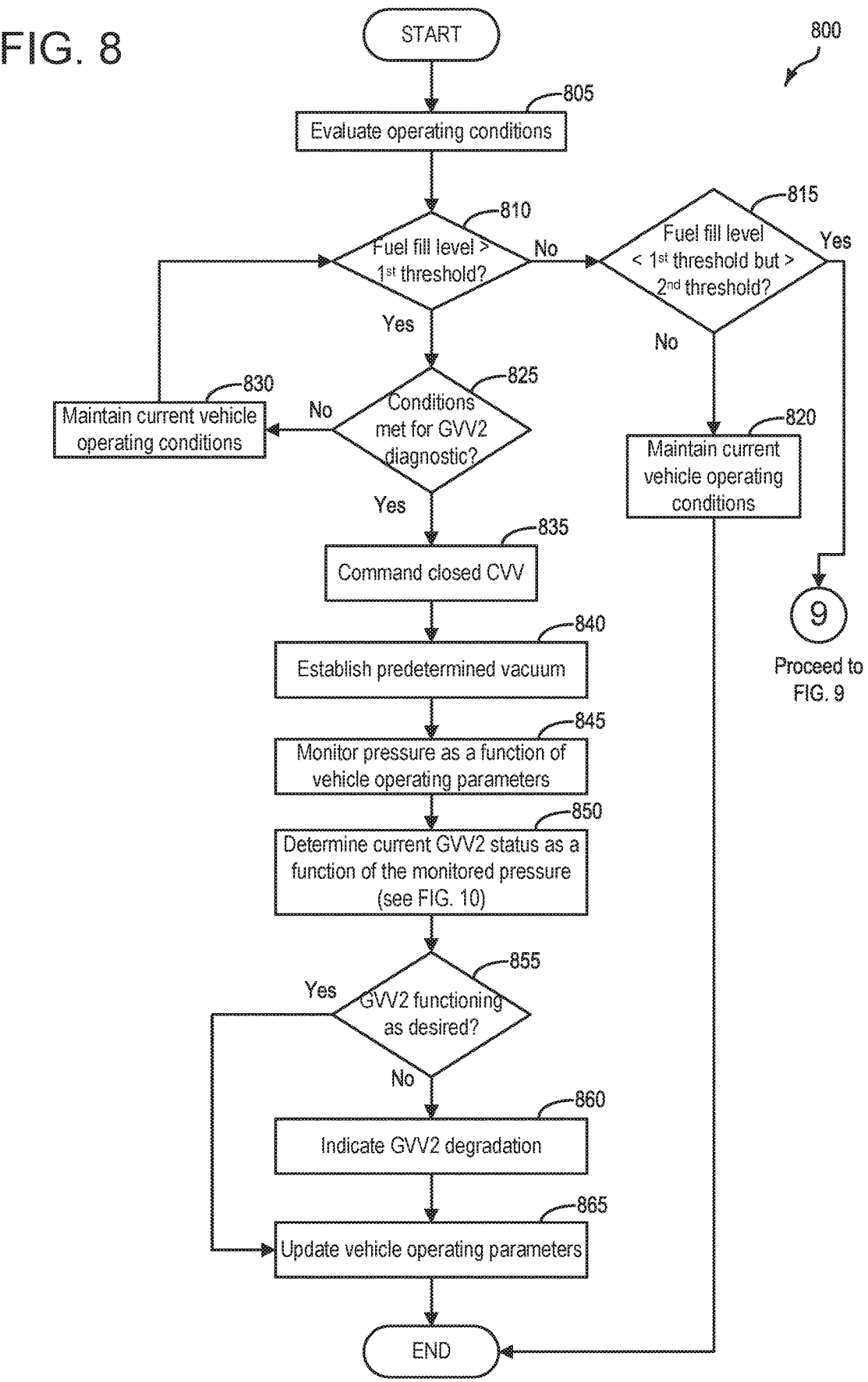
FIG. 8 depicts a high-level example method for determining a current operational state of a second fuel tank grade vent valve that is at a higher elevation with reference to the fuel tank than a first fuel tank grade vent valve.
Figure 9:
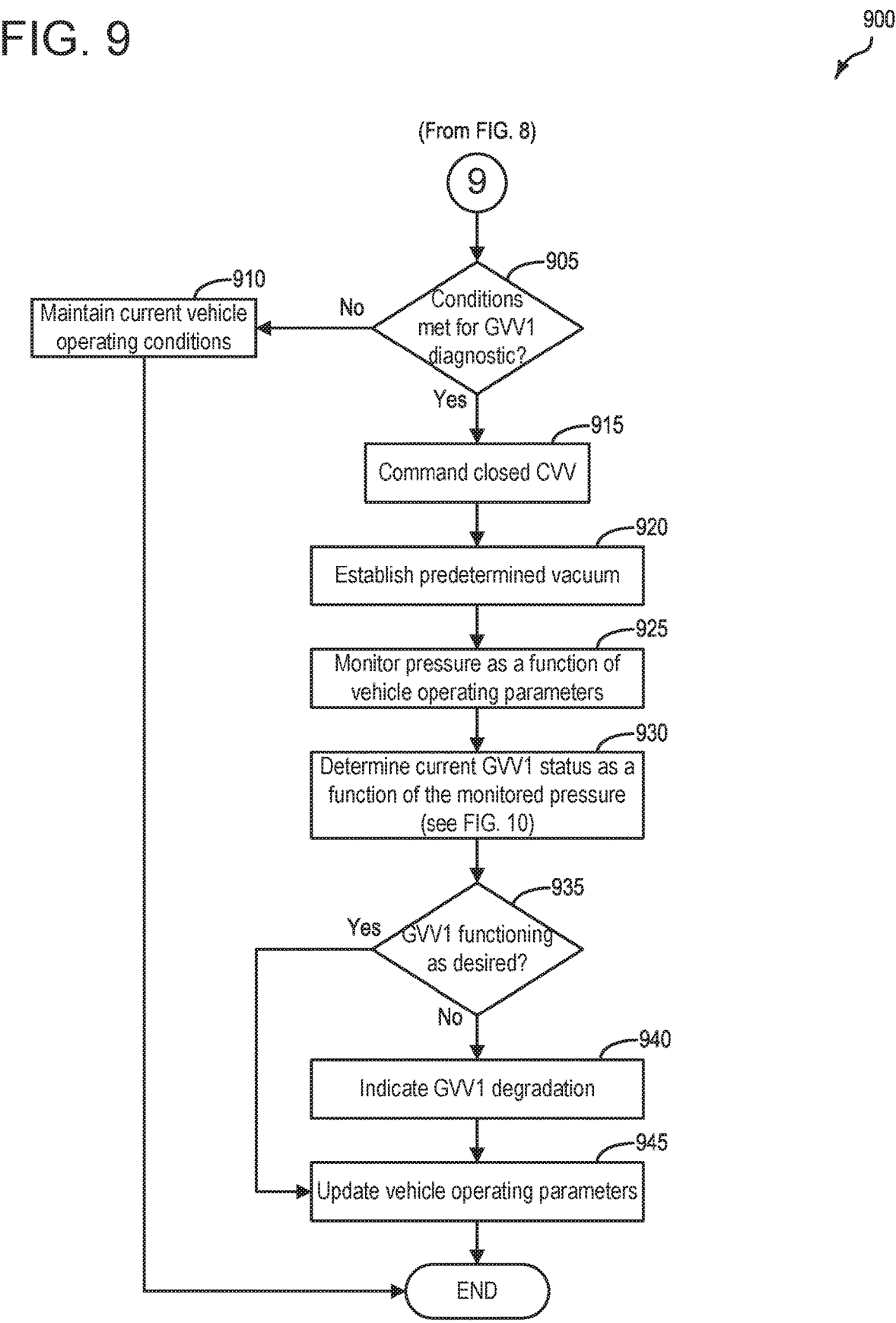
FIG. 9 depicts a high-level example method for determining a current operational state of the first fuel tank grade vent valve that is of a lower elevation with reference to the fuel tank than the second fuel tank grade vent valve.
Figure 11:
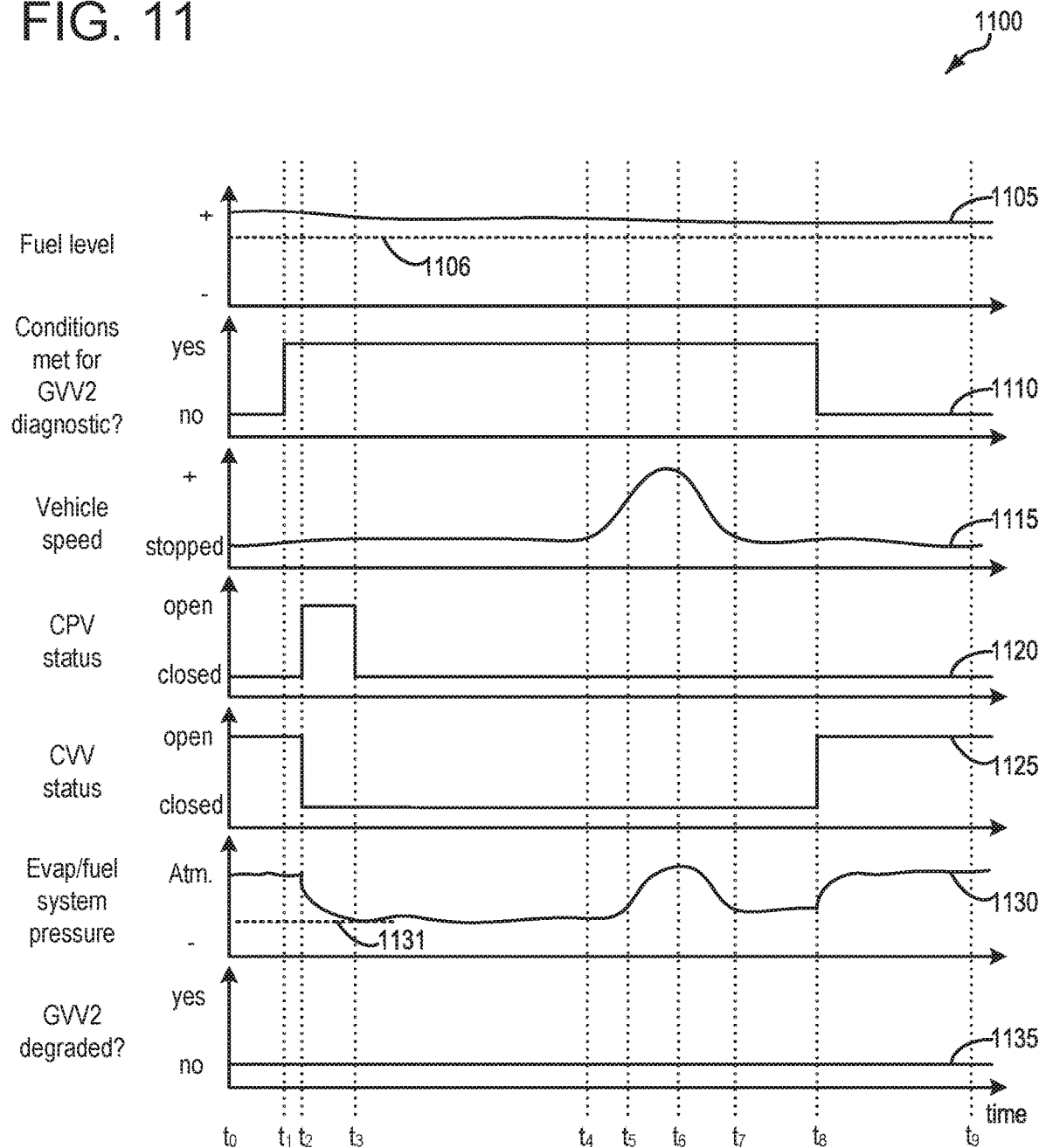
FIG. 11 depicts an example timeline for determining current operational state of the second fuel tank grade vent valve, via the method of FIG. 8.
Figure 12:
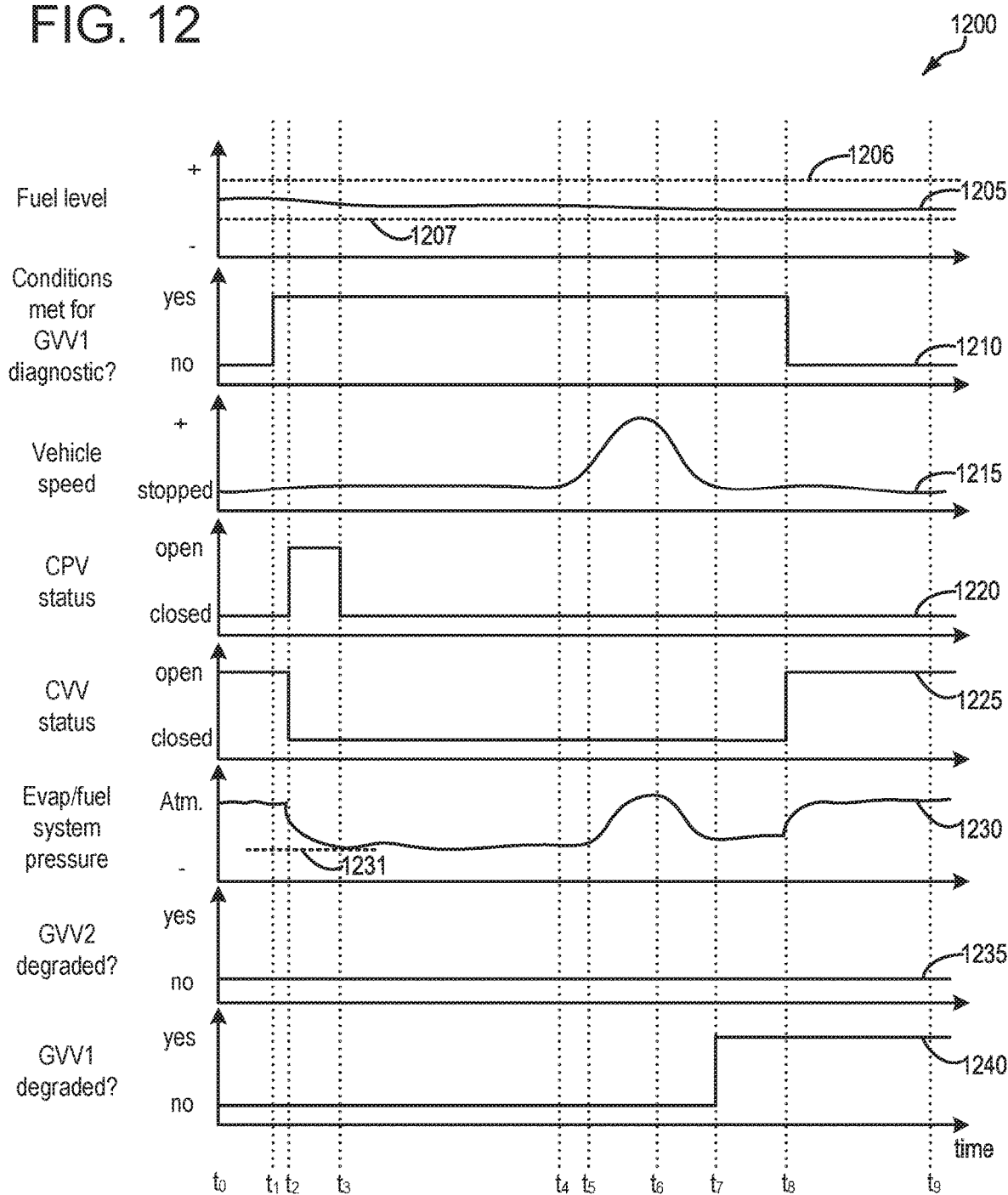
FIG. 12 depicts an example timeline for determining current operational state of the first fuel tank grade vent valve, via the method of FIG. 9.

An example method for conducting a diagnostic on GVV2, positioned higher with regard to fuel tank height as compared to GVV1, is depicted at FIG. 8, whereas an example method for conducting a diagnostic on GVV1 is depicted at FIG. 9. The diagnostics of FIGS. 8-9 rely on pressure monitored in a sealed fuel system and evaporative emissions system (or at least a sealed fuel system) in response to predicted/inferred fuel slosh events, and a lookup table such as the lookup table depicted at FIG. 10 may be used to diagnose current operational state of the GVVs as a function of the monitored pressure. FIG. 11 depicts an example timeline for conducting the GVV2 diagnostic according to the method of FIG. 8, while FIG. 12 depicts an example timeline for conducting the GVV1 diagnostic according to the method of FIG. 9.

Figure 1:
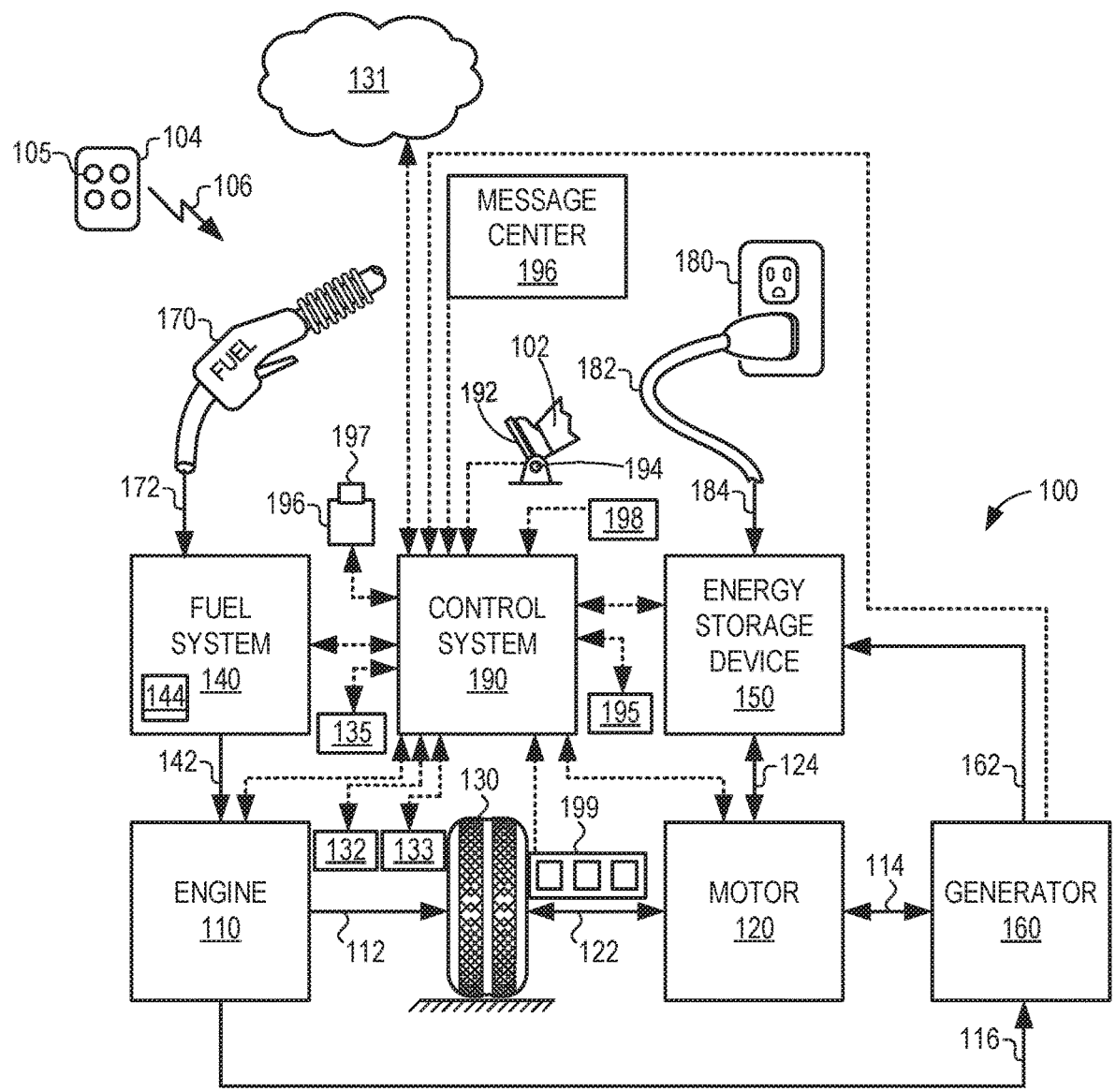
FIG. 1 shows a high-level block diagram illustrating an example vehicle system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor (not shown at FIG. 1 but see FIG. 2). The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (evaporative emissions system) 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle equipped with an engine and not an motor that can operate to at least partially propel the vehicle, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. In some examples, the fuel system may include a fuel tank temperature sensor 296 for measuring or inferring a fuel temperature. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system (referred to herein as evaporative emissions system) 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow the fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. While not explicitly depicted at FIG. 2, it may be understood that fuel tank 220 may not be of a uniform height. Fuel tank height may be variable for a variety of reasons, including but not limited to maximizing space efficiency, staggering a positioning of the one or more fuel tank vent valves with respect to height of the fuel tank, etc. A fuel tank comprising a non-uniform height is depicted at FIG. 5, and such types of fuel tanks will be discussed in greater detail below in terms of diagnostics for determining whether one or more of the GVVs are functioning as desired. Briefly, the GVVs may be positioned at different heights or elevations with respect to the fuel tank, which may enable diagnostics to assess current operational status of such GVVs as a function of at least a fuel level in the fuel tank. Such diagnostics are discussed in detail with regard to the methods of FIGS. 8-9.

Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222, as discussed. The fuel vapor canisters may be filled with an appropriate adsorbent 286b, such that the canisters are configured to temporarily trap fuel vapors (including vaporized hydrocarbons) during fuel tank refilling operations and during diagnostic routines, as will be discussed in detail below. In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve 297 may be a normally open valve. A fuel tank isolation valve (FTIV) 252 may in some examples be positioned between the fuel tank and the fuel vapor canister 222 within conduit 278. However, it may be understood that in other examples, FTIV 252 may not be included without departing from the scope of this disclosure. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve (when included) may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In some examples, purging may include additionally commanding open the FTIV (if included), such that fuel vapors from the fuel tank may additionally be drawn into the engine for combustion. It may be understood that purging the canister further includes commanding or maintaining open CVV 297.

Thus, CVV 297 may function to adjust a flow of air and vapors between canister 222 and the atmosphere, and may be controlled during or prior to diagnostic routines. For example, the CVV may be opened during fuel vapor storing operations (for example, during fuel tank refueling) so that air, stripped of fuel vapor after having passed through the canister, can be pushed out to the atmosphere. Likewise, as mentioned above, during purging operations (for example, during canister regeneration and while the engine is running) the CVV may be opened to allow a flow of fresh air to strip the fuel vapors stored in the canister.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252 (if included), canister purge valve 261, and canister vent valve 297. Controller 212 may receive input data from the various sensors, process the input data, and trigger the actuators in response to the processed input data based on instruction or code programmed therein corresponding to one or more routines. Example control routines are described herein with regard to FIGS. 8-9.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors, or via expiration of a timer set such that when the timer expires the controller is returned to the awake mode. In some examples, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines.

Undesired evaporative emissions detection routines may be intermittently performed by controller 212 on fuel system 218 and/or evaporative emissions system 251 to confirm that undesired evaporative emissions are not present in the fuel system and/or evaporative emissions system. One example test diagnostic for undesired evaporative emissions includes application of engine manifold vacuum on the fuel system and/or evaporative emissions system that is otherwise sealed from atmosphere, and in response to a threshold vacuum being reached, sealing the evaporative emissions system from the engine and monitoring pressure bleed-up in the evaporative emissions system to ascertain a presence or absence of undesired evaporative emissions. In some examples, engine manifold vacuum may be applied to the fuel system and/or evaporative emissions system while the engine is combusting air and fuel. In other examples, the engine may be commanded to be rotated unfueled in a forward direction (e.g. the same direction the engine rotates when combusting air and fuel) to impart a vacuum on the fuel system and/or evaporative emissions system. In still other examples, a pump (not shown) positioned in vent line 227 may be relied upon for applying a vacuum on the fuel system and/or evaporative emissions system.

Controller 212 may further include wireless communication device 280, to enable wireless communication between the vehicle and other vehicles or infrastructures, via wireless network 131.

Such systems and methods may be applicable to autonomous vehicles. Accordingly, turning now to FIG. 3, a block diagram of an example autonomous driving system 300 that may operate, for example, the vehicle system 100, described above at FIG. 1. Herein, the vehicle system 100 will be referred to simply as a "vehicle". The autonomous driving system 300, as shown, includes a user interface device 310, a navigation system 315 (e.g. same as 132), at least one autonomous driving sensor 320, an autonomous mode controller 325, and vehicle subsystems 330.

The user interface device 310 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels (e.g. 130). Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

As discussed above, the vehicle control system (e.g. 190) may broadcast and receive information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Turning now to FIG. 4, an example illustration 400 is shown depicting one example of how a vehicle 405 (which may be the vehicle system discussed above with regard to FIGS. 1-3) may be in wireless communication with infrastructure that includes traffic lights. Said another way, example illustration 400 depicts a smart traffic light 410 in wireless communication 415 with vehicle 405. Smart traffic light 410 may communicate to vehicle 405 a status of smart traffic light 410. For example, smart traffic light 410 may communicate to vehicle 405 how much time is remaining until the light changes from red to green. In another example, smart traffic light 410 may communicate to vehicle 405 how much time is remaining until the light changes from green to red. It is herein recognized that such capability may in some examples enable scheduling of one or more diagnostics related to determining a current operational status of one or more fuel tank GVVs, where such diagnostics rely upon advance knowledge of acceleration/deceleration events, vehicle turning operations, etc. Such methodology will be described in further detail below with regard to the methods of FIGS. 8-9.

Example illustration 400 thus includes vehicle 405, traveling along road 420. Depicted is traffic signal controller 425. Traffic signal controller may transfer information via wired communication 426 on traffic signal phase (e.g. whether the signal is green, yellow or red, duration of time until light changes, etc.), to roadside unit 430. Roadside unit 430 may then broadcast (e.g. wireless communication 415) or transmit such information to vehicle 405, where it may be processed via the controller (e.g. 212). As depicted, the transfer of information between traffic signal controller 425 and roadside unit 430 is via wired communication 426, although in other embodiments such communication may be wireless, without departing from the scope of this disclosure. A traffic management center 435 may collect and process data related to traffic information and/or vehicle information. For example, cables 440 (e.g. fiber optics cables) may communicatively connect traffic signal controller 425 with traffic management center 435, and traffic management center 435 may further be in wireless communication with vehicle 405 (and other vehicles which are not shown in illustration 400). While cables 440 are depicted as providing the communication of information between traffic signal controller 425 and traffic management center 435, it may be understood that in other examples such communication may comprise wireless communication, without departing from the scope of this disclosure. Furthermore, traffic management center 435 may comprise one of a local or state back office, private operator, etc.

While not explicitly illustrated, traffic information may in some examples be additionally or alternatively communicated to vehicle 405 via communication between vehicle 405 and other vehicles (V2V communication). Specifically, another vehicle or vehicles that have waited at the same traffic light (e.g. 410) may communicate duration of time that the traffic light stays red, for example, to vehicle 405. Similarly, vehicle 405 may determine such information, and may communicatively broadcast such information to other vehicles.

The systems described above with regard to FIGS. 1-4 may in some examples enable route-learning methodology to be conducted via the vehicle. Briefly, at a key-on event of the vehicle, vehicle location, driver information, day of week, time of day, etc., may be assessed. Driver information, for example, may be determined via input from the driver, or inferred based on driving habits, seat position, cabin climate control preferences, voice activated commands, etc. Vehicle location may be assessed via the onboard navigation system, for example.

During a subsequent drive cycle, vehicle route information may be recorded. For example, the controller may continuously collect data from various sensor systems and outside sources regarding the vehicle's operations/conditions, location, traffic information, local weather information, etc. The data may be collected via, for example, GPS (e.g. 132), inertial sensors (e.g. 199), lasers, radar, sonar, acoustic sensors, etc. (e.g. 133). Other feedback signals from sensors typical of vehicles may also be recorded. Example sensors may include tire pressure sensors, engine temperature sensors, brake heat sensors, brake pad status sensors, tire tread sensors, fuel sensors, oil level and quality sensors, air quality sensors for detecting temperature, humidity, etc. Still further, the vehicle controller may in some examples also retrieve various types of non-real-time data, for example from a detailed map, which may be stored at the controller or which may be retrieved wirelessly from an external server.

In this way, data regarding particular vehicle driving route(s) may be obtained and stored at the vehicle controller, such that predicted/learned driving routes may be achieved with high accuracy. As an example, data collected with regard to travel routines may be applied to an algorithm that feeds into one or more machine learning algorithms to learn common vehicle travel routes. However, other methods of data processing to learn common routes may be used without departing from the scope of this disclosure. Learned routes may be stored at the controller, and in some examples may be relied upon for scheduling one or more diagnostic procedures. For example, as will be discussed in further detail below with regard to the methods depicted at FIGS. 8-9, one or more diagnostic routines for assessing a current operational status of one or more fuel tank GVVs may rely upon vehicle acceleration/deceleration conditions and/or vehicle turning maneuvers. In a case where the vehicle is travelling along a learned route, the controller may be enabled (via the knowledge of the current route) to predict/infer when acceleration/deceleration events and/or vehicle turning events are likely to occur. In this way, diagnostics may be scheduled at appropriate times when the vehicle is in operation. In other examples, based on information pertaining to a learned route, the vehicle controller may request an acceleration/deceleration event and/or a turning maneuver, such that a GVV diagnostic may be conducted. In an example where a vehicle operator is controlling the vehicle, such a request may be in the form of an audible or visual request. In examples where the vehicle is being controlled autonomously, the request may comprise a vehicle controller initiated command to the autonomous vehicle controller. For example, based on a learned route, the vehicle controller may request an acceleration event to generate a fuel slosh event sufficient for conducting a GVV diagnostic, as will be elaborated below. Other examples include requesting a deceleration event, a right turn, a left turn, etc.

Thus, the systems discussed above with regard to FIGS. 1-4 may enable a system for a vehicle comprising a fuel tank positioned in a fuel system of the vehicle, the fuel tank including a first grade vent valve positioned at a lower height with respect to a maximal height of the fuel tank than a second grade vent valve, and further including a fuel level sensor for monitoring a fuel level in the fuel tank and a fuel tank pressure transducer. Such a system may further include a controller with computer readable instructions stored on non-transitory memory that when executed, cause the controller to: receive an indication of a predicted upcoming fuel slosh event inferred to result in a fuel wave traveling in a direction towards the second grade vent valve and then away from the second grade vent valve and towards the first grade vent valve; establish a predetermined negative pressure with respect to atmospheric pressure in the fuel system within a threshold duration of the fuel slosh event occurring; and diagnose the first grade vent valve in response to the fuel level in the fuel tank being below a first fuel level threshold but greater than a second fuel level threshold and diagnose the second grade vent valve in response to the fuel level in the fuel tank being greater than or equal to the first fuel level threshold, where diagnosing either the first grade vent valve or the second grade vent valve is based on a pressure in the fuel system monitored via the fuel tank pressure transducer during the fuel slosh event.

In such a system, the system may further comprise an onboard navigation system. In such an example, the controller may receive the prediction of the upcoming fuel slosh event based on information retrieved from the onboard navigation system related to a vehicle maneuver inferred to result in the fuel wave traveling in the direction towards the second grade vent valve and then away from the second grade vent valve and towards the first grade vent valve.

In such a system, the system may further comprise a device for wireless communication between the controller of the vehicle and one or more smart traffic lights. In such a system, the controller may receive the prediction of the upcoming fuel slosh event based on information retrieved from the one or more smart traffic lights.

As discussed above with regard to FIG. 2, the fuel tank (e.g. 220) may be of a non-uniform height, and the non-uniform height may be an enabler for conducting GVV diagnostics. Accordingly, turning to FIG. 5, an example illustration 500 depicts fuel tank 220 as being non-uniform in terms of its height. For reference, height of fuel tank 220 is referred to in relation to vertical axis 503, depicted in relation to a vehicle 504. It may be understood that vehicle 504 may comprise vehicle propulsion system 100, for example. Said another way, a top 506 of fuel tank 220 may be closer to a roof 507 of a vehicle 504, whereas a bottom 508 of fuel tank 220 may be closer to a ground 509 upon which vehicle 504 travels.

For such a fuel tank of non-uniform height, vent valves (e.g. FLVV, GVVs) may be positioned at different elevations with respect to the height of the fuel tank. Depicted is first GVV (GVV1) 505, second GVV 515 (GVV2), and FLVV 510. It may be understood that FLVV 510 may be the same FLVV as FLVV 285 depicted at FIG. 2. GVV1 505 may be the same as GVV 287, or may be the same as GVV 283. Similarly, GVV2 515 may be the same as GVV 287, or may be the same as GVV 283. More specifically, the GVVs depicted at FIG. 2 are meant to be illustrative, and discussed herein, it may be understood that GVV1 505 comprises a GVV at a first elevation 520 with respect to the vertical axis 503 of fuel tank 220, whereas GVV2 515 comprises a GVV at a third elevation 540 with respect to the vertical axis 503 of fuel tank 220. FLVV 510 is depicted at a second elevation 530 with respect to the vertical axis 503 of fuel tank 220. In other words, GVV1 is positioned lowest with respect to vertical axis 503 of fuel tank 220, GVV2 is positioned highest with respect to vertical axis 503 of fuel tank 220, and FLVV 510 is positioned at an intermediate position with respect to vertical axis 503 of fuel tank 220 in relation to GVV1 505 and GVV2 515.

As will be elaborated in further detail below, the varying heights of GVV1 505, GVV2 515, and FLVV 510 may enable one or more diagnostics to be conducted to determine whether one or more of the GVVs are functioning as desired (e.g. closing in response to actuators of the GVVs being submerged in fuel and opening in response to actuators of the GVVs being unsubmerged in fuel), as compared to being stuck in an open position or a closed position. The diagnostics may be a function of at least fuel level, as will be discussed in greater detail below. Briefly, when a fuel fill level is greater than a first threshold (e.g. 90% full), it may be understood that GVV1 505 and FLVV 510 may be closed (due to actuators of such valves being submerged in fuel resulting in the valves closing), but GVV2 may be open (e.g. actuator of GVV2 not submerged in fuel). While it may be understood that actuators of the GVVs open and close the GVVs in response to fuel level, discussed herein for simplicity it may be understood that reference to a GVV submerged in fuel is in reference to the GVV being closed as a result of the GVV actuator being submerged in fuel. If, under such circumstances, and further with the evaporative emissions system fluidically coupled to the fuel system and both the evaporative emissions system and fuel system sealed from atmosphere, a fuel slosh event occurs which decreases a vapor space in the fuel system (e.g. a fuel wave travels in the direction of GVV2), then pressure in the sealed fuel system and evaporative emissions system may be expected to increase if the GVV2 is not stuck closed. Specifically, as pressure is inversely related to volume as defined by the ideal gas law (PV=nRT), as volume of the vapor space decreases due to the fuel slosh event, pressure is expected to increase. Along similar lines, as the fuel wave travels in a direction of GVV1 subsequent to traveling in the direction of GVV2, the vapor space may be expected to increase and thus pressure may be expected to decrease. Alternatively, if the GVV2 were stuck closed, then such a pressure increase/decrease may not be indicated due to the GVV1 being submerged in fuel and thus being closed, the FTVV being submerged in fuel and thus being closed, and the GVV2 being stuck closed. In other words, the vapor space as monitored by a pressure sensor (e.g. 291) may remain substantially constant (e.g. not change by more than 2%, or not change by more than 5%) in response to the fuel slosh event when GVV2 is stuck closed. In a case where a zero pressure signal is suddenly observed in response to such a fuel slosh event, then it may be inferred that the GVV2 is stuck open, and that the fuel slosh event resulted in liquid fuel entering the lines coupling the fuel tank to the fuel vapor storage canister, and thus temporarily clogging the lines. In this way, GVV2 may be assessed as to whether its current operational state is one of functioning as desired or expected, or is stuck open or closed.

In similar fashion, current operational state of GVV1 may be assessed. Specifically, with a fuel level below the first threshold but greater than a second threshold that is lower than the first threshold (e.g. fuel fill level at around 60% full), in the absence of a fuel slosh event (and with the vehicle on level ground) it may be understood that GVV1 may be closed due to GVV1 being submerged in fuel, whereas FLVV and GVV2 may be open (e.g. both not submerged in fuel). In response to a fuel slosh event that results in fuel in the tank moving away from GVV1 and towards GVV2, if GVV1 is functioning as desired, then it may be expected that GVV1 may open (due to becoming unsubmerged in fuel) whereas FLVV and GVV2 may close. In such a case, if the evaporative emissions system is sealed and fluidically coupled to the fuel system (also sealed from atmosphere), it may be determined that GVV1 is functioning as desired if a pressure increase in response to the fuel slosh event is not observed (e.g. pressure remains substantially constant, or in other words not changing by more than 2%, or more than 5%). Specifically, because GVV1 opens, the overall vapor space may not change as a result of the fuel slosh event, hence pressure may be maintained substantially constant in response to the fuel slosh event. However, if GVV1 is stuck closed, then a pressure increase may be observed, similar to that discussed above with regard to the GVV2 diagnostic. In this way, GVV1 may be assessed as to whether it is functioning as desired or expected, or is stuck in a closed state.

As will be discussed in further detail below with regard to the methods of FIGS. 8-9, it may be desirable in conducting such diagnostics to introduce a predetermined negative pressure in the sealed fuel system and evaporative emissions system prior to the fuel slosh events, for consistency/reproducibility and robustness in measuring pressure changes in response to fuel slosh events.

As the above-mentioned diagnostics rely on a fuel slosh event, and may include establishing a predetermined negative pressure in the sealed fuel system and evaporative emissions system prior to the fuel slosh event, an entry condition for the diagnostics may be an indication of an upcoming acceleration/deceleration event which may result in such a fuel slosh event, or an indication of a vehicle turning operation which may similarly result in such a fuel slosh event. Anticipating or predicting such events prior to their occurrence will be discussed in further detail below, but it may be understood that determining whether a particular predicted acceleration/deceleration event and/or predicted right or left turn event may be utilized for conducting the GVV1/GVV2 diagnostics discussed above, may be a function of fuel tank orientation with respect to the vehicle.

Accordingly, turning now to FIGS. 6A-6B, depicted are two examples of fuel tank orientation with respect to a front and a back, or rear, of the vehicle, and how a fuel slosh wave may be propagated in response to acceleration/deceleration events. FIG. 6A depicts example illustration 600 where fuel tank 220 is oriented such that GVV1 505 is positioned towards a front 605 of vehicle 504 and where GVV2 515 is positioned towards a rear 606 of vehicle 504. In such an example, upon a vehicle acceleration event, a fuel wave 608 may travel in a direction away from GVV1 505 and towards GVV2 515, as depicted. Alternatively, upon a vehicle deceleration event, fuel wave 608 may travel in a direction away from GVV2 515 and towards GVV1 505.

Turning to FIG. 6B, example illustration 650 depicts fuel tank 220 as being oriented such that GVV1 505 is positioned towards rear 606 of vehicle 504, whereas GVV2 515 is positioned towards a front 605 of vehicle 504. In such an example, upon a vehicle acceleration event, fuel wave 608 may travel in a direction away from GVV2 515 and towards GVV1 505. Alternatively, upon a vehicle deceleration event, fuel wave 608 may travel in a direction away from GVV1 505 and towards GVV2 515.

While FIGS. 6A-6B depict examples where vehicle acceleration/deceleration events may result in fuel waves that result in fuel moving away from and/or towards particular GVVs, in other examples fuel tank 220 may be positioned such that acceleration/deceleration events do not necessarily result in fuel tank waves moving towards and/or away from particular GVVs. Accordingly, turning to FIGS. 7A-7B, depicted are examples where fuel tank 220 is rotated 90° with respect to the fuel tanks depicted at FIGS. 6A-6B. In such examples as will be discussed below, rather than acceleration/deceleration events contributing to fuel wave propagation towards and/or away from particular GVVs, vehicle turning events may instead provide the impetus for fuel wave propagation towards and/or away from particular GVVs.

Turning to FIG. 7A, example illustration 700 depicts fuel tank 220 with GVV1 505 positioned towards a left side 705 of vehicle 504 as viewed from a rear of the vehicle, whereas GVV2 515 is positioned towards a right side 706 of vehicle 504 as viewed from the rear of the vehicle. In such an example, in response to a turn event where a steering wheel 720 is turned in a counterclockwise motion 710, thus resulting in vehicle 504 turning to the left, fuel wave 608 may move in a direction away from GVV1 505 and towards GVV2 515. Alternatively, in response to a turn event where steering wheel 720 is turned in a clockwise motion 712, fuel wave 608 may move in a direction away from GVV2 515 and towards GVV1 505.

Turning to FIG. 7B, example illustration 750 depicts fuel tank 220 with GVV2 515 positioned towards the left side 705 of vehicle 504 as viewed from the rear of the vehicle, whereas GVV1 505 is depicted as being positioned towards the right side 706 of vehicle 504. In such an example, in response to a turn event where steering wheel 720 is turned in a counterclockwise motion 710, thus resulting in vehicle 504 turning to the left, fuel wave 608 may move in a direction away from GVV2 515 and towards GVV1 505. Alternatively, in response to a turn event where steering wheel 720 is turned in clockwise motion 712, fuel wave 608 may move in a direction away from GVV1 505 and towards GVV2 515.

Thus, it may be understood that depending on fuel tank orientation with respect to the vehicle, different vehicle operational maneuvers may serve as impetus for particular GVV diagnostic tests.

Turning now to FIG. 8, a high-level example method 800 is shown for determining whether conditions are met for conducting a GVV diagnostic, and in a case where conditions are met for conducting a GVV2 diagnostic, method 800 may proceed to conduct such a diagnostic. Alternatively, if instead conditions are indicated to be met for conducting a GVV1 diagnostic, then method 800 may proceed to FIG. 9, where the GVV1 diagnostic may be conducted according to method 900. In a case where conditions are met for conducting the GVV2 diagnostic, methodology includes establishing a predetermined negative pressure in the evaporative emissions system and fuel system, where the evaporative emissions system and fuel system are fluidically coupled and sealed from atmosphere. In some examples, as discussed herein, sealing the fuel system and evaporative emissions system together may simply be referred to as sealing the fuel system. Next, in response to a fuel slosh event where a fuel wave is directed towards GVV2 and away from GVV1, a pressure change in the sealed fuel system and evaporative emissions system may be monitored, and based on the monitored pressure change, a determination as to current operational state of GVV2 may be ascertained. Depending on the results of the diagnostic, mitigating action may be taken.

Method 800 will be described with reference to the systems described herein and shown in FIGS. 1-7B, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1-4. The controller may employ actuators such as FTIV (e.g. 252) (where included), CVV (e.g. 297), CPV (e.g. 261), etc., to alter states of devices in the physical world according to the methods depicted below.

Method 800 begins at 805, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 810, method 800 may include indicating whether fuel fill level in the fuel tank is greater than a first fuel level threshold. The first fuel level threshold may be defined as a fuel level where, if at or above the first threshold, GVV1 (e.g. 505) and FLVV (e.g. 510) may be understood to be closed, or in other words, actuators of such valves submerged in fuel thereby shutting said valves, under circumstances where the vehicle is on level ground and stationary. The first fuel level threshold may further defined as a fuel level where, if at or above the first threshold, GVV2 (e.g. 515) may be understood to be open, or in other words, an actuator of the GVV2 not submerged in fuel, provided the vehicle is on level ground. As one example, the first fuel level threshold may comprise a fuel level in the fuel tank that is 90% of a capacity of the tank. However, such an example is meant to be illustrative, and the first fuel level threshold may vary as a function of the particular fuel tank, where the first fuel level threshold comprises a situation where both the GVV1 and the FLVV are understood to be submerged in fuel.

If, at 810, it is indicated that the fuel level in the tank is not above the first threshold, method 800 may proceed to 815. At 815, method 800 may include indicating whether fuel level in the fuel tank is less than the first fuel level threshold but greater than a second fuel fill level threshold. At 815, it may be understood that fuel fill level being less than the first fuel level threshold but greater than the second fuel level threshold may comprise a situation where GVV1 (e.g. 505) is closed, or in other words, submerged in fuel, while FLVV (e.g. 510) and GVV2 (e.g. 515) are not submerged in fuel, or in other words, are open. As one example, the second fuel level threshold may comprise fuel fill level at 60% of the capacity of the tank. However, such an example is meant to be illustrative. In some examples, there may be a third fuel level threshold that is less than the first fuel level threshold but greater than the second fuel level threshold, in order to further define the condition where the GVV1 is submerged in fuel but where the GVV2 and the FLVV are not submerged in fuel, when the vehicle is on level ground and stationary. If, at 815, it is indicated that the fuel level is less than the first fuel level threshold but greater than the second fuel level threshold, or in other words, if at 815 it is indicated that the GVV1 is submerged in fuel while the FLVV and the GVV2 are not, method 800 may proceed to FIG. 9, where method 900 may be carried out. Alternatively, if at 815 it is indicated that fuel fill level is not less than the first fuel level threshold and greater than the second fuel level threshold, method 800 may proceed to 820. At 820, method 800 may include maintaining current vehicle operating conditions. Specifically, at 820, maintaining current vehicle operating conditions may comprise operating the vehicle according to driver demand, without conducting a diagnostic for indicating current status of one or more of the GVVs. Method 800 may then end.

Returning to 810, in response to fuel fill level in the fuel tank being indicated to be greater than the first fuel level threshold, method 800 may proceed to 825. At 825, method 800 may include indicating whether conditions are met for conducting the GVV2 diagnostic. Specifically, as discussed briefly above, the GVV2 diagnostic may include predicting or inferring an upcoming fuel slosh event is inferred to result in a fuel wave traveling in a direction of the GVV2, and upon such an inference, establishing a predetermined negative pressure in the fuel system and evaporative emissions system and monitoring fuel system/evaporative emissions system pressure in response to the fuel slosh event. Based on a pressure change, or lack thereof, in response to the fuel slosh event, it may be inferred as to whether the GVV2 is functioning as desired or expected, or has become degraded to at least some extent.

As discussed briefly above, in some examples the fuel slosh event may comprise an acceleration event and/or a deceleration event, under conditions where the fuel tank is positioned as discussed in detail with regard to FIGS. 6A-6B. In other examples, the fuel slosh event may comprise a vehicle turn event (e.g. a sweeping left turn and/or right turn), under conditions where the fuel tank is positioned as discussed in detail with regard to FIGS. 7A-7B. Accordingly, because the GVV2 diagnostic relies on advance notification of such a fuel slosh event, conditions being met at 825 may include an indication of an upcoming (e.g. within a threshold duration of time, for example within 2 minutes or less, within 1 minute or less, within 30 seconds or less, etc.) fuel slosh event sufficient to conduct the GVV2 diagnostic. It may be understood that a fuel slosh event sufficient to conduct the GVV2 diagnostic may comprise a fuel slosh event that results in GVV2 being at least temporarily submerged in fuel in response to the fuel slosh event, while the GVV1 and the FLVV remain submerged in fuel.

Advance notification of such a fuel slosh event may thus comprise predicting or inferring such a fuel slosh event. Predicting or inferring such a fuel slosh event may include in some examples a use of onboard camera(s) (e.g. 135) to infer an upcoming acceleration/deceleration event, or a right/left turn event. For example, onboard camera(s) may be used to scan an upcoming roadway that the vehicle is travelling along, in order to provide to the vehicle controller information that may be used in predicting or inferring a vehicle acceleration/deceleration event and/or a vehicle turn event which may be utilized for conducting the GVV2 diagnostic. Additionally or alternatively, prediction of such an upcoming fuel slosh event sufficient for conducting the GVV2 diagnostic may include reliance on the onboard navigation system (e.g. 132). For example, in a case of autonomous vehicles, a trip route may be autonomously entered into or selected via the onboard navigation system via the vehicle controller, or may be entered into or selected via the onboard navigation system by a vehicle passenger. In other examples where the vehicle is not an autonomously operated vehicle, a vehicle operator may enter a trip route or select a trip route via the onboard navigation system. Additionally or alternatively, the controller of the vehicle may be capable of route learning methodology, and thus may be enabled to predict a current route that the vehicle is currently traveling, which may enable a prediction/inference as to whether an acceleration/deceleration event or a vehicle turn event is upcoming which may be sufficient for conducting the GVV2 diagnostic.

In still other examples, additionally or alternatively, predicting/inferring an upcoming fuel slosh event sufficient for conducting the GVV2 diagnostic may include reliance on communication of the vehicle controller with a smart traffic light (e.g. 410). For example, based on an indication of when a traffic light is expected to turn green, or when a traffic light is expected to turn red, it may be inferred as to whether an upcoming acceleration/deceleration event is likely to be sufficient for conducting the GVV2 diagnostic relying on a fuel slosh event as discussed. In yet still further examples, V2V communications may additionally or alternatively be relied upon for inferring acceleration/deceleration events and/or turn events that are likely to result in fuel slosh sufficient for conducting the GVV2 diagnostic. For example, V2V communications (alone or in conjunction with other information including but not limited to the onboard navigation system, onboard cameras, information obtained from smart traffic lights, etc.) may be used to gain information from vehicles within a predetermined radius, where such information may include expected acceleration/deceleration and/or turn events, route information for particular vehicles, etc. In this way, the vehicle controller may include information from nearby vehicles in order to predict/infer upcoming vehicle acceleration/deceleration events and/or turn events (depending on the orientation of the fuel tank with respect to the vehicle) likely to be sufficient for conducting the GVV2 diagnostic.

In still other examples, an acceleration event may be predicted in response to a remote start event, or a key-on event, where it may be inferred that the vehicle is likely to accelerate from a standstill within a short time frame.

Thus, based on the above, it may be understood that conditions being met at 825 may include an indication of an upcoming acceleration/deceleration event and/or turn event expected to be sufficient for conducting the GVV2 diagnostic. Conditions being met at 825 may additionally or alternatively include the following. For example, conditions being met at 825 may include an indication that the fuel system and evaporative emissions system are free from sources of undesired evaporative emissions, or in other words, sources where fuel vapors may undesirably escape to atmosphere and which may compromise interpretation of the GVV2 diagnostic. As another example, conditions being met at 825 may include an indication that the GVV2 diagnostic is requested, which may in some examples include an indication that a predetermined duration of time has elapsed since a prior GVV2 diagnostic was conducted. As another example, conditions being met may include an indication of an absence of a request for other diagnostics (e.g. tests for presence or absence of undesired evaporative emissions) and/or vehicle operating procedures (e.g. canister purging operations) which may interfere with the conducting of the GVV2 diagnostic.

If, at 825, conditions are not indicated to be met for conducting the GVV2 diagnostic, then method 800 may proceed to 830, where current vehicle operating conditions may be maintained. Method 800 may then return to 810, such that in the event that the fuel fill level remains above the first threshold fuel level and where conditions become met for conducting the GVV2 diagnostic, method 800 may proceed in doing so. In other examples during the course of a driving routine, fuel fill level may become such that at 815, method 800 may proceed to method 900 where the GVV1 diagnostic may be conducted.

In response to conditions being indicated to be met for conducting the GVV2 diagnostic at 825, method 800 may proceed to 835. At 835, method 800 may include commanding closed the CVV (e.g. 297). Specifically, this methodology assumes that the vehicle does not include an FTIV (e.g. 252), and thus, in commanding closed the CVV, the fluidically coupled evaporative emissions system and fuel system may be understood to be sealed from atmosphere. However, in other examples, the methodology may be used in a vehicle that includes a FTIV, without departing from the scope of this disclosure. In an example where the FTIV is included, prior to sealing the evaporative emission system and fuel system, the evaporative emissions system may first be fluidically coupled to the fuel system by commanding open the FTIV, with the CVV open. In this way, any standing pressure (e.g. positive pressure with respect to atmospheric pressure or negative pressure with respect to atmospheric pressure) may be relieved to atmospheric pressure. In such a case, once pressure in the evaporative emissions system/fuel system reaches atmospheric pressure, the CVV may be commanded closed to seal the fluidically coupled fuel system and evaporative emissions system.

Proceeding to 840, method 800 may include establishing a predetermined vacuum, or in other words, a predetermined negative pressure with respect to atmospheric pressure, in the fluidically coupled evaporative emissions system and fuel system. Establishing the predetermined vacuum at 840 may include commanding open the CPV (e.g. 261), and communicating vacuum derived from the engine to the fluidically coupled fuel system and evaporative emissions system. In some examples, this operation may be conducted with the engine combusting air and fuel. In other examples, this operation may be conducted by rotating the engine unfueled in a forward or default direction, such that the engine rotation generates an intake manifold vacuum that may then be communicated to the sealed and fluidically coupled fuel system and evaporative emissions system. Such an example of relying on unfueled engine rotation may be useful under circumstances where the vehicle is stopped at a stoplight, or stopped in traffic, where the vehicle comprises a start/stop system in which the engine is deactivated in response to vehicle speed and/or engine torque requests being below predetermined speeds and/or torque request thresholds, respectively. In still other examples, a vacuum pump positioned, for example, in a vent line (e.g. 227) of the evaporative emissions system, may be utilized to reduce pressure in the fluidically coupled fuel system and evaporative emissions system, at which point the CVV may be commanded closed to seal the fluidically coupled fuel system and evaporative emissions system from atmosphere.

In still other examples where the vehicle includes an FTIV, there may be opportunity to establish the predetermined negative pressure in the fuel system and rely on the FTIV alone for sealing the fuel system, for conducting the GVV2 diagnostic. In one example, in response to conditions being met at 825, the FTIV may be commanded open to relieve pressure in the fuel system, then the CVV may be commanded closed. The negative pressure may then be established in the fuel system and evaporative emissions system, at which the FTIV may be commanded closed and the CVV may be commanded open. In such an example, the GVV2 diagnostic may be conducted in similar fashion as in a case where the fuel system and evaporative emissions system are fluidically coupled (with the CVV closed) for conducting the diagnostic. In other examples, there may be circumstances where a negative pressure already exists in the fuel system that is sealed via the FTIV, and under such circumstances, the existing negative pressure may be used for conducting the diagnostic without first venting the fuel system, etc., provided the existing negative pressure is equal to or more negative than the predetermined negative pressure. While it is herein recognized that in some examples the FTIV may be relied upon in similar fashion to the CVV for sealing the fuel system and conducting the GVV2 diagnostic, for simplicity the diagnostic will be discussed in terms of a fluidically coupled fuel system and evaporative emissions system, where the CVV is relied upon for sealing the fluidically coupled fuel system and evaporative emissions system. However, it may be understood that, discussed herein, commanding closed the CVV may simply be referred to as sealing the fuel system, as mentioned above.

Continuing on, with the predetermined negative pressure established, method 800 may proceed to 845. At 845, method 800 may include monitoring pressure in the fluidically coupled and sealed fuel system and evaporative emissions system. In the alternative example where the FTIV is relied upon for the diagnostic, pressure may be monitored in the sealed fuel system alone, with the evaporative emissions system fluidically coupled to atmosphere. In either case, it may be understood that the FTPT (e.g. 291) may be used for monitoring the pressure.

At 845, monitoring pressure may comprise monitoring pressure in response to the fuel slosh event that is predicted or inferred. In some examples the fuel slosh event may comprise an acceleration event, and may further comprise a subsequent deceleration event and/or a plateau in vehicle speed. In other examples, the fuel slosh event may comprise a turn event and may further comprise a straightening out of the vehicle, and/or a subsequent turn event in the opposite direction. In other examples, the fuel slosh event may comprise a deceleration event, and may further comprise a subsequent acceleration event and/or a plateau in vehicle speed. The pressure may be monitored as a function of vehicle operating parameters which include the acceleration/deceleration event(s) and/or turn event(s). In other words, pressure may be monitored during the vehicle operating conditions that induce the fuel slosh event sufficient for conducting the GVV2 diagnostic. An indication that the fuel slosh event has occurred may be communicated to the vehicle controller via information retrieved from the onboard navigation system, additionally or alternatively in response to onboard camera(s) indicating the fuel slosh event is likely to have occurred, additionally or alternatively in response to a change in traffic light status, additionally or alternatively in response to V2V communications indicative of the vehicle having conducted a routine (e.g. acceleration/deceleration event and/or turn event) sufficient for inducing the fuel slosh event for conducting the GVV2 diagnostic, and additionally or alternatively in response to an indication provided via the fuel level sensor.

Proceeding to 850, in response to the fuel slosh event having been indicated to have occurred, method 800 may include determining GVV2 status as a function of the monitored pressure. Such a determination may involve the vehicle controller querying a lookup table, such as the lookup table depicted at FIG. 10.

Figure 10:
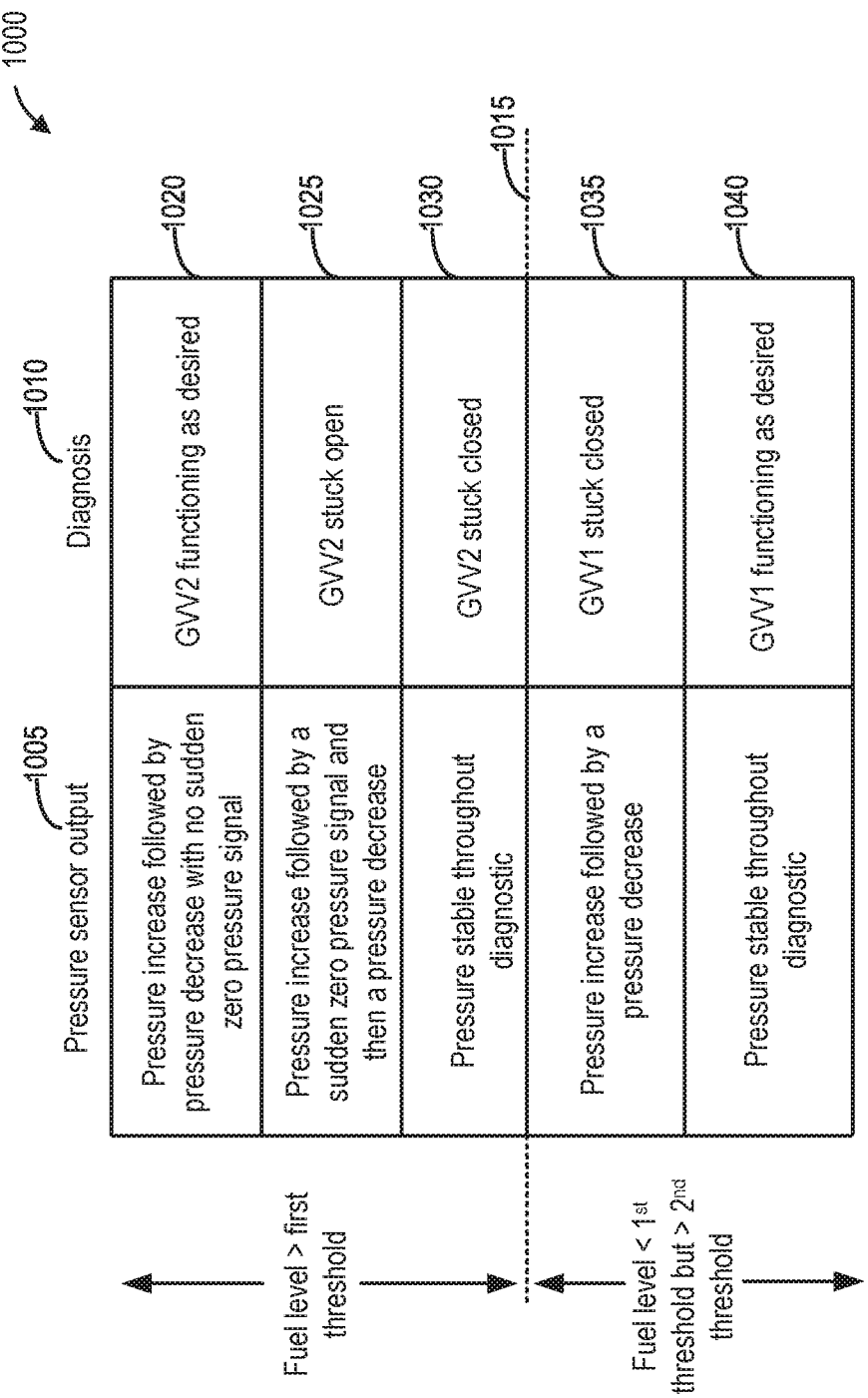
FIG. 10 depicts an example lookup table for assessing a current state of fuel tank grade vent valves, for use in conjunction with the methods of FIGS. 8-9.

Turning now to FIG. 10, lookup table 1000 is depicted. Left-hand column 1005 depicts output from the pressure sensor during the fuel slosh event, while right-hand column 1010 depicts a diagnosis based on the pressure sensor output. Dashed line 1015 separates lookup table 1000 into two portions, where above dashed line 1015 lookup table 1000 depicts diagnosis in terms of the monitored pressure when fuel level in the fuel tank is above the first fuel level threshold, or in other words, relates to diagnoses for the GVV2 diagnostic. Alternatively, information provided in lookup table 1000 below dashed line 1015 relates to situations where fuel level is less than the first threshold fuel level, but greater than the second fuel level threshold. In other words, information below dashed line 1015 relates to diagnoses for the GVV1 diagnostic.

Turning to the diagnoses related to the GVV2 diagnostic, in terms of method 800, row 1020 includes pressure sensor output that first increases, and then decreases, with no sudden zero pressure signal. In such an example, it may be indicated that the GVV2 is functioning as desired or expected. Specifically, in such an example, the fuel slosh wave traveling towards the GVV2 initially reduced an amount of vapor space in the sealed fuel system and evaporative emissions system, thus resulting in a pressure increase. Next, for example in response to the vehicle stopping accelerating and then plateauing in speed or decelerating, or when the vehicle stops turning and straightens out or turns in the opposite direction, as the fuel slosh wave travels away from the GVV2 the vapor space may be increased, thus resulting in a pressure decrease. Because of the absence of the zero pressure signal, it may be understood that liquid fuel did not enter into the lines coupling the fuel system to the evaporative emissions system, and accordingly, it may be indicated that the GVV2 is functioning as desired. More specifically, in response to the fuel slosh event traveling toward the GVV2, the GVV2 closed as expected, thus preventing the introduction of liquid fuel into the lines coupling the fuel system to the evaporative emissions system (and resulting in an observed pressure increase). In response to the fuel slosh wave then traveling away from the GVV2, the GVV2 opened, thus resulting in an increase in vapor space and a pressure decrease.

Turning to row 1025, in an example where a zero pressure signal is observed, bounded by a pressure increase and a pressure decrease as fuel travels toward and away, respectively, from the GVV2, it may be indicated that the GVV2 is stuck in an open configuration. Specifically, pressure increases as the vapor space is reduced due to the fuel slosh wave traveling toward the GVV2, but because the GVV2 doesn't close as expected, liquid fuel enters the lines and results in a sudden zero pressure signal as the lines become clogged. Subsequently, as the fuel slosh event travels away from GVV2, pressure decreases due to the increase in vapor space.

Turning to row 1030, in response to pressure not changing, or in other words in response to the pressure being maintained stable (e.g. pressure maintained substantially constant without a change in pressure greater than a 2% change, or greater than a 5% change), then it may be indicated that the GVV2 is stuck closed. Said another way, in a case where the GVV2 is stuck closed, in response to the fuel slosh event the vapor space as monitored via the FTPT remains unchanged, and thus the absence of observable pressure change.

In this way, by the controller querying lookup table 1000 depicted at FIG. 10, it may be determined as to whether the GVV2 is functioning as desired or expected (e.g. closing in response to being submerged in fuel and opening in response to becoming unsubmerged), or is stuck in an open or closed configuration.

Accordingly, returning to 850, upon querying the lookup table of FIG. 10, method 800 may proceed to 855. At 855, method 800 may include indicating whether GVV2 is functioning as desired or expected. If so, method 800 may proceed to 865. At 865, method 800 may include updating vehicle operating parameters to reflect the results of the diagnostic. Specifically, the result may be stored at the controller, and a schedule for conducting the GVV2 diagnostic may be updated based on the GVV2 diagnostic having been conducted and having indicated the GVV2 as functioning as desired or expected. Updating vehicle operating parameters at 865 may further include commanding open the CVV to relieve pressure in the fluidically coupled fuel system and evaporative emissions system. In a case where the vehicle includes the FTIV, and where the FTIV was relied upon for conducting the diagnostic, the FTIV may be commanded open to relieve fuel system pressure, and then may be commanded closed. In still another example where the vehicle includes the FTIV but where the CVV was relied upon for conducting the GVV2 diagnostic, the CVV may be commanded open to relieve pressure in the fluidically coupled fuel system and evaporative emissions system, after which the FTIV may be commanded closed. Method 800 may then end.

Returning to 855, in response to an indication that GVV2 is not functioning as desired, method 800 may proceed to 860. At 860, method 800 may include indicating GVV2 degradation, which as discussed may include indicating that the GVV2 is stuck open, or alternatively, is stuck closed. Proceeding to 865, method 800 may include updating vehicle operating parameters. Specifically, in response to an indication of a stuck closed GVV2, updating vehicle operating parameters may include setting a diagnostic trouble code (DTC) indicative of the stuck closed GVV2. A malfunction indicator light (MIL) may be illuminated at the vehicle dash, alerting a vehicle operator (or passenger in the case of an autonomous vehicle) of a request to service the vehicle. In some examples, the controller may set a threshold fuel level for future refueling events, such that issues related to the malfunctioning GVV2 may be avoided. As an example, an indication to the vehicle operator/passenger may be communicated via an audible or visible alert, requesting fuel fill level at subsequent refueling events to be maintained at or below the second threshold, or in other examples, below the second threshold. In the case of an autonomous vehicle, the controller may communicate with a means for refueling the vehicle, to limit the refueling amount to the specified amount as discussed.

In still other examples, in response to the GVV2 being stuck closed, the controller may store instructions to request particular parking scenarios to avoid parking in such a manner where the only avenue for pressure relief is via the GVV2, which is stuck closed. In this way, fuel tank overpressurization may be avoided. Specifically, during a parking operation, the vehicle controller may rely on inertial sensor(s) (e.g. 199) and if it is determined that the vehicle is parked in such a manner where the stuck closed GVV2 is the only route for pressure relief (where pressure relief cannot be achieved due to GVV2 being stuck closed), then a visible or audible alert may be provided to the vehicle operator to park in another location. In a case of an autonomously controlled vehicle, the vehicle may be controlled to another parking location upon such an inference.

Alternatively, in response to an indication that the GVV2 is stuck open, the following mitigating action may be taken. First, a DTC may be set and a MIL illuminated to indicate a request for vehicle service. To avoid introduction of liquid fuel into lines coupling the fuel system to the evaporative emissions system, the vehicle controller may provide a visual or audible alert, to avoid parking the vehicle on slopes which may result in liquid fuel being routed in the direction of the GVV2 thus providing a potential for introduction of liquid fuel into the lines coupling the fuel system and evaporative emissions system. In one example, in response to the GVV2 being indicated to be stuck open, upon parking the vehicle, inertial sensors (e.g. 199) may be relied upon to infer whether it may be likely that given the parking conditions, liquid fuel may enter into the lines via the open GVV2. In such a case, a visible or audible alert may be provided, requesting the vehicle to be parked in another manner/other location, to reduce opportunity for liquid fuel to enter into the lines via the open GVV2. In a case of an autonomously operated vehicle, the controller may, upon parking, query inertial sensor(s), and if the inertial sensor(s) indicate a likelihood of fuel entering the lines as a result of the parking condition, then the controller may control the vehicle to another parking location. In some examples, whether the vehicle is autonomously operated or operated by a human, if equipped, the vehicle controller may command an active suspension to level the vehicle such that the potential for fuel introduction into the lines may be reduced. A similar strategy may be used in a case where the GVV2 is stuck closed. In either cases where the vehicle is operated by a human operator, or is autonomously controlled, the indication of the likelihood of liquid fuel entering the lines (or an indication of a potential overpressurization condition as discussed above for a stuck closed GVV2) may be provided as a function of information retrieved from the inertial sensors regarding vehicle one or more of vehicle pitch, yaw, and roll, and may further include fuel tank fuel fill level, and fuel tank dimensions (e.g. computer assisted drawings of the fuel tank).

Furthermore, as above with regard to updating vehicle operating parameters, at 865, pressure in the fuel system and evaporative emissions system may be relieved. For example, in a case where the CVV was relied upon for conducting the diagnostic, the CVV may be commanded open. In other examples, the FTIV may be commanded open to relieve pressure, and then may be commanded closed, as discussed above. Method 800 may then end.

Returning to 815, in a case where fuel fill level in the fuel tank is less than the first threshold but greater than the second threshold, or in other words, under circumstances where GVV1 is submerged in fuel when the vehicle is on level ground (and where the vehicle is static), but where the FLVV and GVV2 are not submerged in fuel, method 800 may proceed to FIG. 9 where the GVV1 diagnostic may be conducted provided conditions are met for doing so.

Accordingly, turning to FIG. 9, method 900 extends from method 800 and as such, it may be understood that method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-4. The controller may employ actuators such as FTIV (e.g. 252) (where included), CVV (e.g. 297), CPV (e.g. 261), etc., to alter states of devices in the physical world according to the methods depicted below.

At 905, method 900 includes indicating whether conditions are met for conducting the GVV1 diagnostic. As discussed briefly above, the GVV1 diagnostic may be conducted in similar fashion as that of the GVV2 diagnostic. Briefly, the GVV1 diagnostic includes predicting or inferring a fuel slosh event that will result in a fuel wave traveling in a direction of the GVV2, where such a fuel slosh event is expected to, as the fuel wave travels toward GVV2, result in GVV1 becoming no longer submerged in fuel (thus at least transiently opening if functioning as desired or expected). Similar to the GVV2 diagnostic, in response to an indication of such an upcoming fuel slosh event, the method may include establishing a predetermined negative pressure in the fuel system and evaporative emissions system, and monitoring fuel system/evaporative emissions system pressure in response to the fuel slosh event. Lookup table 1000 depicted at FIG. 10 may then be queried by the controller in order to indicate whether the GVV1 is functioning as desired or is stuck closed, based on the monitored pressure in response to the fuel slosh event.

Accordingly, predicting such an upcoming fuel slosh event sufficient to conduct the GVV1 diagnostic may involve the same methodology as discussed at step 825 above with regard to method 800. Briefly, a fuel slosh event sufficient for conducting the GVV1 diagnostic may be a function of fuel tank orientation with regard to the vehicle, as discussed above with regard to FIGS. 6A-7B. Accordingly, depending on fuel tank orientation, acceleration/deceleration events and/or right/left turn events may be sufficient for conducting the GVV1 diagnostic. Because the GVV1 diagnostic relies on advance notification of such fuel slosh events, conditions being met at 905 may include an indication of an upcoming (e.g. within a threshold duration of time, for example within 2 minutes or less, within 1 minute or less, within 30 seconds or less, etc.) fuel slosh event sufficient to conduct the diagnostic. With regard to the GVV1 diagnostic, it may be understood that a fuel slosh event being sufficient to conduct the GVV1 diagnostic may comprise a fuel slosh event that travels in a direction of the GVV2 thereby resulting in submerging of the FLVV and GVV2, and in doing so, results in GVV1 being unsubmerged, and thus opening if functioning as desired or expected.

Thus, advance notification of such a fuel slosh event may comprise predicting or inferring the fuel slosh event via one or more of onboard camera(s), use of the onboard navigation system, via indications provided based on learned driving routes, communication with smart traffic lights, V2V communications, a remote start event, a key-on event, etc. Thus, conditions may be indicated to be met when it is predicted or inferred that an upcoming fuel slosh event is inferred to be sufficient for conducting the GVV1 diagnostic. Conditions being met at 905 may in some examples additionally include an indication that the fuel system and evaporative emissions system are free from sources of undesired evaporative emissions, that a predetermined time period has elapsed since a prior GVV1 diagnostic was conducted, an absence of a request for other diagnostics and/or vehicle operating procedures which may interfere with the conducting of the GVV1 diagnostic, etc. Conditions being met at 905 may further include, in some examples, an indication that the GVV2 is functioning as desired or expected.

If, at 905, conditions are not indicated to be met for conducting the GVV1 diagnostic, method 900 may proceed to 910. At 910, method 900 may include maintaining current vehicle operating conditions. In other words, the vehicle may be controlled based on driver demand, or in the case of an autonomously operated vehicle, based on signals from the controller for operating the vehicle, without conducting the GVV1 diagnostic. Method 900 may then end.

Returning to 905, in a case where conditions are met for conducting the GVV1 diagnostic, method 900 may proceed to 915. At 915, method 900 may include commanding closed the CVV to seal the fluidically coupled fuel system and evaporative emissions system. As mentioned above, such action may take place in a situation where the vehicle does not include the FTIV. If an FTIV is included, then in some examples the FTIV may first be commanded open to relieve fuel system pressure, and then the CVV may be commanded closed to seal the fluidically coupled fuel system and evaporative emissions system in response to pressure in the fuel system and evaporative emissions system reaching atmospheric pressure.

Proceeding to 920, in response to commanding closed the CVV, method 900 may include establishing the predetermined vacuum in the fluidically coupled fuel system and evaporative emissions system. As discussed, vacuum may be established via commanding open the CPV (e.g. 261) while the engine is combusting air and fuel, to communicate a negative pressure with respect to atmospheric pressure on the sealed fuel system and evaporative emissions system. In other examples, a similar approach may be used except that the negative pressure may be communicated via the engine being rotated unfueled. In still other examples, a vacuum pump positioned in the vent line may be used to establish the predetermined negative pressure. Once established, the CPV may be commanded closed (in a case where the engine was used to generate the vacuum). As discussed above, in some examples where the FTIV is included, upon establishing the predetermined vacuum, the FTIV may be commanded closed and the CVV may be commanded open.

Proceeding to 925, method 900 may include monitoring pressure via the FTPT (e.g. 291), during the fuel slosh event. The pattern of pressure change may be stored at the controller. More specifically, as mentioned above for the GVV2 diagnostic, the fuel slosh event may comprise an acceleration event followed by a speed plateau or deceleration event (or vice versa). In another example, the fuel slosh event may comprise a turn followed by a straightening of the vehicle, and in some examples may further include another turn in the opposite direction. Thus, pressure changes of the vapor space as defined by the fuel fill level and as a function of the sealed fluidically coupled fuel system and evaporative emissions system, or simply sealed fuel system, may be monitored throughout the fuel slosh event and then compared to a lookup table (e.g. lookup table 1000) in order to determine current operational state of the GVV1.

Accordingly, proceeding to 930, method 900 may include determining current GVV1 operational state based on the lookup table depicted at FIG. 10. Turning to FIG. 10, row 1035 and row 1040 arranged below dashed line 1015 depict diagnoses related to the GVV1 diagnostic. Specifically, at row 1035, if the pressure monitored during the GVV1 diagnostic was indicated to involve a pressure increase followed by a pressure decrease, then it may be indicated that the GVV1 is stuck closed. In other words, because a pressure change is observed, this is an indication that the GVV1 did not open, and thus the vapor space became smaller as the fuel wave traveled towards GVV2, resulting in the initial pressure increase, followed by the pressure decrease as the vapor space becomes greater as the fuel wave travels away from GVV2 and towards GVV1. Alternatively, if pressure is stable throughout the diagnostic then the inference is that the GVV1 is functioning as desired. Said another way, as the fuel wave travels toward the GVV2, the GVV1 opens and thus there is no overall change in vapor space observed. As the vapor space remains unchanged, then the inference is that GVV1 must have opened in response to fuel traveling away from GVV1 and towards GVV2.

Thus, returning to method 900 at FIG. 9, in response to the controller of the vehicle querying the lookup table of FIG. 10, method 900 may proceed to 935. At 935, method 900 may include indicating whether GVV1 is functioning as desired or expected. As discussed above, in response to pressure remaining stable (e.g. not changing by more than 2% or more than 5%) during the GVV1 diagnostic, it may be indicated that the GVV1 is functioning as desired or expected. Such a result may be stored at the controller. Proceeding to 945, method 900 may include updating vehicle operating parameters based on the results of the GVV1 diagnostic. For example, a schedule for testing the GVV1 may be updated as a function of the indicated result. Updating vehicle operating parameters at 945 may further include commanding open the CVV to relieve pressure in the fluidically coupled fuel system and evaporative emissions system. In a case where the vehicle includes the FTIV, and where the FTIV was relied upon for conducting the diagnostic, the FTIV may be commanded open to relieve fuel system pressure, and then may be commanded closed. In still another example where the vehicle includes the FTIV but where the CVV was relied upon for conducting the GVV1 diagnostic, the CVV may be commanded open to relieve pressure in the fluidically coupled fuel system and evaporative emissions system, after which the FTIV may be commanded closed. Method 900 may then end.

Returning to 935, in response to GVV1 not being indicated to be functioning as desired, or in other words, in response to an indication that GVV1 is stuck closed, method 900 may proceed to 940. At 940, method 900 may include indicating GVV1 degradation, where the result may be stored at the controller, a DTC may be set reflecting the degraded GVV1, and a malfunction indicator light may be illuminated, to indicate a request to have the vehicle serviced.

Proceeding to 945, method 900 may include updating vehicle operating parameters. For example, the GVV1 diagnostic schedule may be updated to reflect the degraded state of the GVV1. In some examples, in response to GVV1 being stuck closed, mitigating action may be taken to avoid vehicle parking scenarios where GVV1 is the only path for fuel tank pressure relief (which cannot occur due to the GVV1 being stuck closed). Briefly, as discussed above, inertial sensors (e.g. 199) may be used in conjunction with fuel fill level and a model of the vehicle fuel tank, to predict when a parking scenario results in the GVV1 being the only path for fuel tank venting. In the event that such a scenario is detected, a visible or audible alert may be provided to the vehicle operator, requesting the vehicle to be moved to another more appropriate location. In the case of an autonomously operated vehicle, the vehicle may be autonomously controlled to another parking location. In some examples, rather than moving the vehicle, an active suspension may be employed (if the vehicle is equipped) to level the vehicle, and thus the fuel tank, to avoid the undesirable issue related to the parking scenario.

Furthermore, updating vehicle operating parameters at 945 may further include commanding open the CVV to relieve pressure in the fluidically coupled fuel system and evaporative emissions system. In a case where the vehicle includes the FTIV, and where the FTIV was relied upon for conducting the diagnostic, the FTIV may be commanded open to relieve fuel system pressure, and then may be commanded closed. In still another example where the vehicle includes the FTIV but where the CVV was relied upon for conducting the GVV1 diagnostic, the CVV may be commanded open to relieve pressure in the fluidically coupled fuel system and evaporative emissions system, after which the FTIV may be commanded closed. Method 900 may then end.

Thus, discussed herein, a method may comprise predicting an upcoming fuel slosh event in a fuel tank positioned in a fuel system of a vehicle, sealing the fuel system within a threshold duration of the upcoming fuel slosh event, and diagnosing a first or a second grade vent valve coupled to the fuel tank as a function of a fuel level in the fuel tank and a pressure monitored in the fuel system during the fuel slosh event.

In such a method, the method may further comprise diagnosing the first grade vent valve under conditions where the fuel level in the fuel tank is lower than a first fuel level threshold but greater than a second fuel level threshold, and diagnosing the second grade vent valve under conditions where the fuel level in the fuel tank is greater than or equal to the first fuel level threshold.

In such a method, the fuel slosh event may result in a fuel wave traveling first in a direction towards the second grade vent valve and away from the first grade vent valve, and subsequently in a direction away from the second grade vent valve and towards the first grade vent valve.

In such a method, the fuel tank may be of a non-uniform height, wherein the first grade vent valve is at a lower height and wherein the second grade vent valve is at a greater height with respect to a maximal height of the fuel tank, and wherein a fuel limit vent valve is positioned at an intermediate height with respect to the first grade vent valve and the second grade vent valve.

In such a method, the method may further comprise indicating the second grade vent valve is stuck closed in response to the pressure remaining substantially constant during the fuel slosh event, indicating the second grade vent valve is functioning as desired or expected in response to the pressure increasing and then decreasing with an absence of a zero pressure reading during the fuel slosh event, and indicating the second grade vent valve is stuck open in response to the zero pressure reading during the fuel slosh event.

In such a method, the method may further comprise indicating the first grade vent valve is stuck closed in response to the pressure increasing and then decreasing during the fuel slosh event, and indicating the first grade vent valve is functioning as desired or expected in response to the pressure remaining substantially constant during the fuel slosh event.

In such a method, the first grade vent valve may be submerged in fuel throughout the fuel slosh event when diagnosing the second grade vent valve, and the first grade vent valve may becomes transiently unsubmerged and then resubmerged in fuel during the fuel slosh event when diagnosing the first grade vent valve.

In such a method, the second grade vent valve may become transiently submerged in liquid fuel during the fuel slosh event when diagnosing the first grade vent valve and the second grade vent valve.

In such a method, predicting the upcoming fuel slosh event may be a function of an orientation of the fuel tank with respect to the vehicle.

In such a method, predicting the upcoming fuel slosh event may be based on one or more of information retrieved from an onboard navigation system, information provided as a result of route-learning methodology, information retrieved from a smart traffic system, and information related to driving patterns of nearby vehicles as retrieved via vehicle-to-vehicle communications.

In such a method, sealing the fuel system within the threshold duration of the upcoming fuel slosh event may further comprise establishing a predetermined negative pressure with respect to atmospheric pressure in the fuel system.

In such a method, the method may further comprise in response to an indication of degradation of either the first grade vent valve or the second grade vent valve, taking mitigating action that may include providing requests to either a vehicle operator or an autonomous control system of the vehicle to avoid specified parking situations which may lead to one or more of undesirable pressure increases in the fuel system and/or liquid fuel entering into one or more lines that couple the fuel system to an evaporative emissions control system.

Another example of a method may comprise predicting in advance a fuel slosh event in a fuel tank positioned in a fuel system of a vehicle, the fuel slosh event inferred to result in a fuel wave traveling towards a second, higher elevation grade vent valve with respect to a maximal height of the fuel tank and away from a first, lower elevation grade vent valve, and then traveling away from the second grade vent valve and towards the first grade vent valve; trapping a predetermined negative pressure with respect to atmospheric pressure in the fuel system within a threshold duration of the fuel slosh event occurring; monitoring a pressure in the fuel system during the fuel slosh event; and indicating, based on the pressure monitored in the fuel system during the fuel slosh event, whether the second grade vent valve is degraded when a fuel level in the fuel tank is greater than or equal to a first fuel level threshold, or whether the first grade vent valve is degraded when the fuel level in the fuel tank is less than the first fuel level threshold but greater than a second fuel level threshold.

In such a method, the method may further include where under conditions where the fuel level in the fuel tank is greater than or equal to the first fuel level threshold, the first grade vent valve remains submerged in fuel throughout the fuel slosh event, and wherein under conditions where the fuel level in the fuel tank is less than the first fuel level threshold but greater than the second fuel level threshold, the first grade vent valve becomes transiently unsubmerged in fuel during the fuel slosh event.

In such a method, indicating degradation of the second grade vent valve may include indicating the second grade vent valve is stuck closed in response to the pressure remaining substantially constant during the fuel slosh event, or indicating the second grade vent valve is stuck open in response to a zero pressure reading during the fuel slosh event.

In such a method, indicating degradation of the first grade vent valve may include indicating the first grade vent valve is stuck closed in response to the pressure increasing and then decreasing during the fuel slosh event.

In such a method, the method may further comprise in response to an indication of degradation of either the first grade vent valve or the second grade vent valve, monitoring one or more of a vehicle pitch angle, vehicle yaw angle, and vehicle roll angle during a parking condition or driving condition of the vehicle, and providing a request to avoid situations where fuel tank pressure relief is compromised due to the degraded first grade vent valve or the second grade vent valve or that there is a likelihood of liquid fuel entering into one or more lines that couple the fuel system to an evaporative emissions control system of the vehicle.

Turning now to FIG. 11, example timeline 1100 is shown, depicting how a GVV2 diagnostic may be conducted. Timeline 1100 includes plot 1105, indicating fuel level in the fuel tank (e.g. 220), over time. Fuel level may increase (+) or decrease (−), over time. Timeline 1100 further includes plot 1110, indicating whether conditions are met for conducting the GVV2 diagnostic (yes or no), over time. Timeline 1100 further includes plot 1115, indicating vehicle speed, over time. In this example timeline, vehicle speed may either be stopped (e.g. 0 mph), or may be greater than (+) stopped. Timeline 1100 further includes plot 1120, indicating CPV status (open or closed), over time. Timeline 1100 further includes plot 1125, indicating CVV status (open or closed), over time. Timeline 1100 further includes plot 1130, indicating pressure in the evaporative emissions system and fuel system, over time. In this example timeline, pressure may be either at or near atmospheric pressure (atm.), or may be negative (−) with respect to atmospheric pressure. Timeline 1100 further includes plot 1135, indicating whether GVV2 is degraded (yes or no), over time.

At time t0, fuel level is greater than the first fuel level threshold, as represented by dashed line 1106 (plot 1105). However, conditions are not yet met for conducting the GVV2 diagnostic (plot 1110). In this example timeline 1100, at time t0 the vehicle is stopped (plot 1115), the CPV is closed (plot 1120), and the CVV is open (plot 1125). In this example timeline, for simplicity, it is assumed that an FTIV is not included in the vehicle. Accordingly, with the CVV open, pressure in the fluidically coupled fuel system and evaporative emissions system is near atmospheric pressure (plot 1130). As of time t0, there is no indication that the GVV2 is degraded (plot 1135).

At time t1, conditions are indicated to be met for conducting the GVV2 diagnostic. Circumstances that result in conditions being met at 1110 have been discussed in detail above with regard to step 825 of method 800, and thus will not be reiterated here in full for brevity. However, it may be understood that conditions being met include an indication of an upcoming vehicle maneuver (e.g. acceleration/deceleration event and/or a turn event) sufficient for inducing a fuel slosh event which may be relied upon for conducting the GVV2 diagnostic.

With conditions being met at time t1, the CVV is commanded closed at time t2, and the CPV is commanded open. In this example, it may be understood that with the CPV commanded open, a negative pressure established by the engine may be communicated to the sealed fuel system and evaporative emissions system. In one example, the negative pressure is based on the engine combusting air and fuel. However, in this example timeline 1100, the vehicle is stopped at time t2, and it may be understood that the vehicle comprises a start/stop vehicle where the engine is deactivated during an idle stop. Accordingly, the engine is rotated unfueled based on a command from the controller to utilize the motor (e.g. 120) to rotate the engine unfueled for vacuum generation.

Between time t2 and t3, pressure in the sealed fuel system and evaporative emissions system becomes negative with respect to atmospheric pressure (plot 1130). At time t3, pressure in the fuel system and evaporative emissions system reaches the predetermined negative pressure, represented as dashed line 1131. With the predetermined negative pressure having been reached, the CPV is commanded closed (plot 1120), and the engine is stopped from being rotated unfueled (not shown). Between time t3 and t4, pressure in the fuel system and evaporative emissions system remains stable at the predetermined negative pressure, as the vehicle is maintained stopped (plot 1115). In other words, between time t3 and t4, fuel level in the fuel system remains stable, and as such, pressure as monitored via the FTPT (e.g. 291) remains stable.

At time t4, the vehicle begins an acceleration event (plot 1115). In this example timeline, it may be understood that the vehicle acceleration event is in response to a traffic light turning green, which may be understood was predicted/inferred to occur based on wireless communication between the controller of the vehicle and the traffic light itself (see description of FIG. 4). However, it may be understood that the vehicle in this example timeline is not at a front of a line of cars stopped at the light, but rather is in a long line of cars stopped at the light. Accordingly, as the light turns green near time t4, the vehicle accelerates between time t4-t5, then stops accelerating between time t5 and t6, and decelerates to a standstill between time t6 and t7. In this example timeline, it may further be understood that the vehicle fuel tank is positioned as depicted at FIG. 6A. Thus, when the vehicle accelerates, a fuel wave travels in a direction of GVV2, and upon deceleration, the fuel wave travels away from GVV2 in a direction of GVV1.

In response to the acceleration and deceleration between time t4-t7, pressure as monitored via the FTPT (e.g. 291) increases as a function of the acceleration, and decreases as a function of the deceleration. As depicted at lookup table 1000 at FIG. 10, such a pattern of pressure corresponds to a situation where GVV2 is functioning as desired. In other words, as the fuel wave travels toward GVV2 (during acceleration), the vapor space of the fuel system and evaporative emissions system decreases, thus pressure increases. Alternatively, as the fuel wave travels towards GVV1 and away from GVV2 (during deceleration), the vapor space of the fuel system and evaporative emissions system increases, and thus pressure decreases. Accordingly, GVV2 degradation is not indicated (plot 1135), and at time t8 conditions are no longer indicated to be meet for conducting the GVV2 diagnostic (plot 1110). Accordingly, the CVV is commanded open (plot 1125), and with the CVV open, pressure in the fuel system and evaporative emissions system rapidly returns to atmospheric pressure between time t8 and t9. The vehicle remains stopped between time t8 and t9.

While example timeline 1100 depicts a GVV2 diagnostic which may be conducted when fuel level is above the first fuel level threshold, as discussed a GVV1 diagnostic may be conducted under circumstances where fuel level is such that the GVV1 is submerged but the FLVV and the GVV2 are not (when the vehicle is on level ground and idle, for example). Accordingly, turning now to FIG. 12, example timeline 1200 is depicted, illustrating how a GVV1 diagnostic may be conducted. Timeline 1200 includes plot 1205, indicating fuel level in the fuel tank (e.g. 220), over time. Fuel level may increase (+) or decrease (−), over time. Timeline 1200 further includes plot 1210, indicating whether conditions are met for conducting the GVV1 diagnostic (yes or no), over time. Timeline 1200 further includes plot 1215, indicating vehicle speed, over time. In this example timeline, vehicle speed may be stopped (e.g. 0 mph), or may be at a speed greater than (+) stopped. Timeline 1200 further includes plot 1220, indicating CPV status, and plot 1225, indicating CVV status, over time. The CPV and the CVV may be either open or closed, over time. Timeline 1200 further includes plot 1230, indicating pressure in the evaporative emissions system and fuel system, over time. In this example timeline, pressure may be either at or near atmospheric pressure (atm.), or may be at a negative (−) pressure with respect to atmospheric pressure. Timeline 1200 further includes plot 1235, indicating whether GVV2 is degraded (yes or no), over time, and plot 1240, indicating whether GVV1 is degraded (yes or no) over time.

At time t0 fuel level in the fuel tank is less than the first fuel level threshold, represented as dashed line 1206, but greater than the second fuel level threshold, represented by dashed line 1207. However, conditions are not yet indicated to be met for conducting the GVV1 diagnostic (plot 1210). The vehicle is stopped (plot 1215), the CPV is closed (pot 1220), the CVV is open (plot 1225), and with the CVV open, pressure in the fluidically coupled fuel system and evaporative emissions system is near atmospheric pressure. In this example timeline 1200, for simplicity it may be understood that the vehicle system does not include an FTIV. However, as discussed above, the FTIV may be included in other examples without departing from the scope of this disclosure. At time t0, GVV2 is indicated to not be degraded (plot 1235). Specifically, it may be understood that a previous diagnostic was conducted on GVV2, such that it is known at the time of t0 that GVV2 is not degraded. Furthermore, at time t0 there is not currently an indication that GVV1 is degraded (plot 1240).

At time t1, conditions are indicated to be met for conducting the GVV1 diagnostic. Conditions being met for conducting such a diagnostic have been discussed in detail above with regard to step 905 of method 900, and for brevity will not be reiterated here. However, it may be understood that conditions being met at time t1 include an indication that it is predicted/inferred that a predicted/inferred upcoming vehicle maneuver (e.g. acceleration event/deceleration event, turn event, etc.) is likely to result in a fuel slosh event in the fuel tank sufficient to conduct the GVV1 diagnostic. More specifically, that the fuel slosh event is likely to result in GVV1 being unsubmerged with fuel as the fuel wave travels toward GVV2, where fuel traveling toward GVV2 results in the submerging of GVV2 and FLVV with liquid fuel.

With conditions met for conducting the GVV1 diagnostic, at time t2 the CVV is commanded closed (plot 1225), and the CPV is commanded open (plot 1220). With the CVV closed, the fluidically coupled fuel system and evaporative emissions system are sealed from atmosphere. By commanding open the CPV, engine manifold vacuum is applied on the sealed fuel system and evaporative emissions system. Similar to that discussed above at FIG. 11, in this example timeline 1200, it may be understood that the vehicle is equipped with start/stop capability, and thus with the vehicle stopped it may be understood that the engine is not combusting air and fuel. Thus, in this particular example, it may be understood that via a command from the controller, the engine is commanded to rotate unfueled via the motor (e.g. 120) in a forward, or default direction, to generate the negative pressure with respect to atmosphere which may be communicated to the sealed fuel system and evaporative emissions system. Accordingly, between time t2 and t3, with the CPV open and the engine being rotated to generate vacuum, pressure in the sealed fuel system and evaporative emissions system is rapidly reduced, and at time t3, reaches the predetermined negative pressure for conducting the GVV1 diagnostic (represented by dashed line 1231). With the predetermined negative pressure established at time t3, the CPV is commanded closed (plot 1220), and while not explicitly illustrated, it may be understood that the engine is also stopped from rotating unfueled. Between time t3 and t4, pressure in the sealed fuel system remains near the predetermined negative pressure 1231.

Similar to the timeline depicted at FIG. 11, in this example timeline, the vehicle controller is wirelessly communicating with smart traffic lights, as discussed above with regard to FIG. 4. The vehicle is in a long line of cars stopped at a particular light, and thus when the light turns green at time t4, the vehicle accelerates between time t4 and t5, before stopping accelerating between time t5 and t6, and then decelerating between time t6 and t7 before coming to another stop. Thus, it may be understood that in this example, the vehicle did not travel through the light, but rather accelerated in response to the light turning green, then decelerated to once again stop at the same light. Furthermore, similar to example timeline 1100, the fuel tank is oriented as depicted at FIG. 6A such that, in response to acceleration the fuel wave travels toward the GVV2, whereas in response to deceleration the fuel wave travels away from GVV2 and towards GVV1.

In response to the acceleration/deceleration event between time t4 and t7, pressure in the sealed fuel system and evaporative emissions system is monitored via the FTPT (e.g. 291). In this example timeline, a pressure increase is observed between time t5 and t6 in response to the vehicle acceleration, whereas pressure decreases between time t6 and t7 in response to the deceleration (see plot 1230 and compare to plot 1215). As discussed above with regard to the method of FIG. 9, if GVV1 is functioning as desired or expected, then as the fuel wave travels towards GVV2 in response to vehicle acceleration, the GVV2 and FLVV are expected to close, but GVV1 is expected to open. In this way, the vapor space of the sealed fuel system and evaporative emissions system may not be expected to change if the GVV1 is functioning as desired (e.g. opening in response to becoming unsubmerged by liquid fuel). However, that is not what is observed in this example scenario. Instead, pressure rises in conjunction with the vehicle acceleration and falls in conjunction with the vehicle deceleration. Such a pattern of pressure change while conducting the GVV1 diagnostic may be expected in a case where GVV1 is stuck closed, because in such a case, when the fuel wave travels toward GVV2, the vapor space is decreased and thus pressure increases, whereas when the fuel wave travels toward GVV1, the vapor space is increased and thus pressure decreases. Thus, based on the monitored pressure during the acceleration/deceleration event, lookup table 1000 is queried by the controller, where it is determined that GVV1 is stuck closed. Accordingly, at time t7, GVV1 is indicated as being degraded, or in other words is indicated as being stuck closed.

With the GVV1 indicated to be degraded, at time t8 conditions are no longer indicated as being met for conducting the GVV1 diagnostic (plot 1210). A DTC is set at the controller, and a MIL is illuminated indicating a request to have the vehicle serviced. Accordingly, the CVV is commanded open (plot 1225), and pressure in the fuel system and evaporative emissions system rapidly returns to atmospheric pressure between time t8 and t9. Furthermore, the vehicle is maintained stopped between time t8 and t9.

In this way, diagnostics may be regularly conducted to determine whether one or more GVVs associated with a fuel tank that supplies fuel to an engine of a vehicle are functioning as desired or expected. By regularly conducting such diagnostics, situations that may otherwise result in liquid fuel entering into lines (for example liquid fuel entering into lines that couple the fuel system and evaporative emissions system when GVV2 is stuck open), may be actively avoided by requesting particular parking scenarios to avoid such occurrences. Such requests may be commanded via a controller in the case of an autonomous vehicle, or may be communicated to a vehicle operator either audibly or visually, in a case of a vehicle that is operated by a human. In other examples where one or more of the GVVs are stuck closed, similarly parking scenarios may be controlled to avoid situations where a particular GVV is the only path for pressure reduction, such as may occur when parking on particular grades that may isolate particular portions of the fuel tank. Again, controlling/requesting such parking scenarios may be in the form of commands from the controller in the case of an autonomous vehicle, or may be in the form of visual or audible signals in the case where the vehicle is operated by a human operator. Furthermore, by reducing potential for the introduction of liquid fuel into the lines coupling the fuel system to the evaporative emissions system, opportunities for liquid fuel entering into the canister may be reduced or avoided. By avoiding corruption of the adsorbent material positioned in the canister, canister lifetime may be extended and release of undesired evaporative emissions to atmosphere reduced or avoided.

The technical effect is to recognize that when a fuel tank height is irregular and where GVVs are positioned at different heights with respect to the fuel tank height, depending on fuel level in the fuel tank different GVV diagnostics may be conducted. For example, a technical effect is to recognize that, when fuel level is greater than a first fuel level threshold (e.g. when fuel submerges GVV1 and FLVV but does not submerge GVV2), a fuel slosh event may be used to infer whether the GVV2 is degraded, based on monitoring pressure changes in a sealed fuel system and evaporative emissions system as a function of the fuel slosh event. Another technical effect is to recognize that, when fuel level is less than the first fuel level threshold, but greater than the second fuel level threshold (e.g. when GVV1 is submerged in fuel but where FLVV and GVV2 are not), a fuel slosh event may be used to infer whether the GVV1 is functioning as desired by monitoring pressure changes in a sealed fuel system and evaporative emissions system as a function of the fuel slosh event.

A further technical effect is to recognize that such monitoring of pressure is based on advanced knowledge of the fuel slosh event, and that as such, one or more of route learning methodology, onboard navigation systems, communication with the vehicle controller and smart traffic systems, V2V and/or V2I2V communications, onboard camera(s), etc., may be relied upon for inferring an upcoming fuel slosh event such that the predetermined negative pressure (as discussed above) may be established in the fuel system and evaporative emissions just prior (e.g. within 1 minute or less, within 30 seconds or less, etc.) to the particular fuel slosh event occurring. In this way, the vehicle may be prepared for monitoring pressure as a function of the fuel slosh event, and thus may be enabled to diagnose current operational state of one or more of GVV1 and/or GVV2 based on such a fuel slosh event.

A still further technical effect is to recognize that, depending on fuel tank orientation with respect to the vehicle, the particular vehicle maneuver for enabling the one or more GVV diagnostics may be different. Thus, by relying on one or more of route learning methodology, onboard navigation systems, smart traffic systems, V2V/V2I2V communications, onboard cameras, etc., and with information pertaining to fuel tank orientation stored at the controller, conditions being met for conducting particular GVV diagnostics may be readily ascertained such that robust results may be obtained.

Thus, the systems described herein, and with reference to FIGS. 1-4, along with the methods discussed herein, and with reference to FIGS. 8-9, may enable one or more systems and one or more methods. In one example, a method comprises predicting an upcoming fuel slosh event in a fuel tank positioned in a fuel system of a vehicle; sealing the fuel system within a threshold duration of the upcoming fuel slosh event; and diagnosing a first or a second grade vent valve coupled to the fuel tank as a function of a fuel level in the fuel tank and a pressure monitored in the fuel system during the fuel slosh event. In a first example of the method, the method may further comprise diagnosing the first grade vent valve under conditions where the fuel level in the fuel tank is lower than a first fuel level threshold but greater than a second fuel level threshold; and diagnosing the second grade vent valve under conditions where the fuel level in the fuel tank is greater than or equal to the first fuel level threshold. A second example of the method optionally includes the first example, and further includes wherein the fuel slosh event results in a fuel wave traveling first in a direction towards the second grade vent valve and away from the first grade vent valve, and subsequently in a direction away from the second grade vent valve and towards the first grade vent valve. A third example of the method optionally includes any one or more or each of the first through second examples, and further includes wherein the fuel tank is of a non-uniform height; and wherein the first grade vent valve is at a lower height and wherein the second grade vent valve is at a greater height with respect to a maximal height of the fuel tank; and wherein a fuel limit vent valve is positioned at an intermediate height with respect to the first grade vent valve and the second grade vent valve. A fourth example of the method optionally includes any one or more or each of the first through third examples, and further comprises indicating the second grade vent valve is stuck closed in response to the pressure remaining substantially constant during the fuel slosh event; indicating the second grade vent valve is functioning as desired or expected in response to the pressure increasing and then decreasing with an absence of a zero pressure reading during the fuel slosh event; and indicating the second grade vent valve is stuck open in response to the zero pressure reading during the fuel slosh event. A fifth example of the method optionally includes any one or more or each of the first through fourth examples, and further comprises indicating the first grade vent valve is stuck closed in response to the pressure increasing and then decreasing during the fuel slosh event; and indicating the first grade vent valve is functioning as desired or expected in response to the pressure remaining substantially constant during the fuel slosh event. A sixth example of the method optionally includes any one or more or each of the first through fifth examples, and further includes wherein the first grade vent valve is submerged in fuel throughout the fuel slosh event when diagnosing the second grade vent valve; and wherein the first grade vent valve becomes transiently unsubmerged and then resubmerged in fuel during the fuel slosh event when diagnosing the first grade vent valve. A seventh example of the method optionally includes any one or more or each of the first through sixth examples, and further includes wherein the second grade vent valve becomes transiently submerged in liquid fuel during the fuel slosh event when diagnosing the first grade vent valve and the second grade vent valve. An eighth example of the method optionally includes any one or more or each of the first through seventh examples, and further includes wherein predicting the upcoming fuel slosh event is a function of an orientation of the fuel tank with respect to the vehicle. A ninth example of the method optionally includes any one or more or each of the first through eighth examples, and further includes wherein predicting the upcoming fuel slosh event is based on one or more of information retrieved from an onboard navigation system, information provided as a result of route-learning methodology, information retrieved from a smart traffic system, and information related to driving patterns of nearby vehicles as retrieved via vehicle-to-vehicle communications. A tenth example of the method optionally includes any one or more or each of the first through ninth examples, and further includes wherein sealing the fuel system within the threshold duration of the upcoming fuel slosh event further comprises: establishing a predetermined negative pressure with respect to atmospheric pressure in the fuel system. An eleventh example of the method optionally includes any one or more or each of the first through tenth examples, and further comprises in response to an indication of degradation of either the first grade vent valve or the second grade vent valve, taking mitigating action that includes providing requests to either a vehicle operator or an autonomous control system of the vehicle to avoid specified parking situations which may lead to one or more of undesirable pressure increases in the fuel system and/or liquid fuel entering into one or more lines that couple the fuel system to an evaporative emissions control system.

Another example of a method comprises predicting in advance a fuel slosh event in a fuel tank positioned in a fuel system of a vehicle, the fuel slosh event inferred to result in a fuel wave traveling towards a second, higher elevation grade vent valve with respect to a maximal height of the fuel tank and away from a first, lower elevation grade vent valve, and then traveling away from the second grade vent valve and towards the first grade vent valve; trapping a predetermined negative pressure with respect to atmospheric pressure in the fuel system within a threshold duration of the fuel slosh event occurring; monitoring a pressure in the fuel system during the fuel slosh event; and indicating, based on the pressure monitored in the fuel system during the fuel slosh event, whether the second grade vent valve is degraded when a fuel level in the fuel tank is greater than or equal to a first fuel level threshold, or whether the first grade vent valve is degraded when the fuel level in the fuel tank is less than the first fuel level threshold but greater than a second fuel level threshold. In a first example of the method, the method further includes wherein under conditions where the fuel level in the fuel tank is greater than or equal to the first fuel level threshold, the first grade vent valve remains submerged in fuel throughout the fuel slosh event; and wherein under conditions where the fuel level in the fuel tank is less than the first fuel level threshold but greater than the second fuel level threshold, the first grade vent valve becomes transiently unsubmerged in fuel during the fuel slosh event. A second example of the method optionally includes the first example and further includes wherein indicating degradation of the second grade vent valve includes indicating the second grade vent valve is stuck closed in response to the pressure remaining substantially constant during the fuel slosh event, or indicating the second grade vent valve is stuck open in response to a zero pressure reading during the fuel slosh event. A third example of the method optionally includes any one or more or each of the first through second examples, and further includes wherein indicating degradation of the first grade vent valve includes indicating the first grade vent valve is stuck closed in response to the pressure increasing and then decreasing during the fuel slosh event. A fourth example of the method optionally includes any one or more or each of the first through third examples, and further comprises in response to an indication of degradation of either the first grade vent valve or the second grade vent valve, monitoring one or more of a vehicle pitch angle, vehicle yaw angle, and vehicle roll angle during a parking condition or driving condition of the vehicle; and providing a request to avoid situations where fuel tank pressure relief is compromised due to the degraded first grade vent valve or the second grade vent valve or that there is a likelihood of liquid fuel entering into one or more lines that couple the fuel system to an evaporative emissions control system of the vehicle.

A system for a vehicle may comprise a fuel tank positioned in a fuel system of the vehicle, the fuel tank including a first grade vent valve positioned at a lower height with respect to a maximal height of the fuel tank than a second grade vent valve, and further including a fuel level sensor for monitoring a fuel level in the fuel tank and a fuel tank pressure transducer; and a controller with computer readable instructions stored on non-transitory memory that when executed, cause the controller to: receive an indication of a predicted upcoming fuel slosh event inferred to result in a fuel wave traveling in a direction towards the second grade vent valve and then away from the second grade vent valve and towards the first grade vent valve; establish a predetermined negative pressure with respect to atmospheric pressure in the fuel system within a threshold duration of the fuel slosh event occurring; and diagnose the first grade vent valve in response to the fuel level in the fuel tank being below a first fuel level threshold but greater than a second fuel level threshold and diagnose the second grade vent valve in response to the fuel level in the fuel tank being greater than or equal to the first fuel level threshold, where diagnosing either the first grade vent valve or the second grade vent valve is based on a pressure in the fuel system monitored via the fuel tank pressure transducer during the fuel slosh event. In a first example of the system, the system may further comprise an onboard navigation system; and wherein the controller receives the prediction of the upcoming fuel slosh event based on information retrieved from the onboard navigation system related to a vehicle maneuver inferred to result in the fuel wave traveling in the direction towards the second grade vent valve and then away from the second grade vent valve and towards the first grade vent valve. A second example of the system optionally includes the first example, and further comprises a device for wireless communication between the controller of the vehicle and one or more smart traffic lights; and wherein the controller receives the prediction of the upcoming fuel slosh event based on information retrieved from the one or more smart traffic lights.

In another representation, a method comprises, in response to a request for diagnosing a second grade vent valve that is positioned at a greater height with respect to a fuel tank than a first grade vent valve, or for diagnosing the first grade vent valve, commanding or requesting a vehicle maneuver for generating a fuel slosh event in the fuel tank sufficient for conducting the desired grade vent valve diagnostic. The requested or commanded vehicle maneuver may comprise one of an acceleration event, a deceleration event, a vehicle right-hand turn, or a vehicle left hand turn. The requested or commanded vehicle maneuver may be a function of an orientation of the fuel tank with respect to the vehicle. In some examples, the command or request may include a commanded or requested speed at which the vehicle accelerates or decelerates, or an angle and/or speed at which the vehicle turns. In examples where the vehicle is operated by a human operator, the command or request may be in the form of a visible or audible alert. In examples where the vehicle is autonomously operated, the command may be in the form of a controller specifying the desired maneuver. The requested or commanded maneuver may be in response to an indication of a fuel fill level in the fuel tank, and may further be in response to an indication that the maneuver may be readily conducted without any adverse incidents. As one example, such an indication may rely on an onboard navigation system, V2V communications between the vehicle and other nearby vehicles, communication with the vehicle controller and a smart traffic light, based on route learning methodology, etc. The diagnostic for the second grade vent valve may be conducted in response to fuel fill level being greater than a first fuel level threshold, whereas the diagnostic for the first grade vent valve may be conducted in response to fuel fill level being less than the first fuel level threshold but greater than the second fuel level threshold. In some examples where the vehicle comprises an autonomous vehicle, the diagnostic may be conducted in response to an indication of an absence of passengers in the vehicle. It may be understood that in such a method, the diagnostics may be conducted in a substantially similar manner as that discussed above with regard to FIGS. 8-9, with the exception being that rather than predicting or inferring potential scenarios where a fuel slosh event may be sufficient for conducting the GVV diagnostic, the fuel slosh event is actively induced via a request from the vehicle controller. In this way, fuel slosh events may be more precisely controlled, which may improve robustness and reliability of the above-described diagnostic methodlogy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
predicting an upcoming fuel slosh event in a fuel tank positioned in a fuel system of a vehicle;
sealing the fuel system within a threshold duration of the upcoming fuel slosh event; and
diagnosing a first or a second grade vent valve coupled to the fuel tank as a function of a fuel level in the fuel tank and a pressure monitored in the fuel system during the fuel slosh event.

2. The method of claim 1, further comprising diagnosing the first grade vent valve under conditions where the fuel level in the fuel tank is lower than a first fuel level threshold but greater than a second fuel level threshold; and
diagnosing the second grade vent valve under conditions where the fuel level in the fuel tank is greater than or equal to the first fuel level threshold.

3. The method of claim 1, wherein the fuel slosh event results in a fuel wave traveling first in a direction towards the second grade vent valve and away from the first grade vent valve, and subsequently in a direction away from the second grade vent valve and towards the first grade vent valve.

4. The method of claim 1, wherein the fuel tank is of a non-uniform height; and
wherein the first grade vent valve is at a lower height and wherein the second grade vent valve is at a greater height with respect to a maximal height of the fuel tank; and
wherein a fuel limit vent valve is positioned at an intermediate height with respect to the first grade vent valve and the second grade vent valve.

5. The method of claim 1, further comprising:
indicating the second grade vent valve is stuck closed in response to the pressure remaining substantially constant during the fuel slosh event;
indicating the second grade vent valve is functioning as desired or expected in response to the pressure increasing and then decreasing with an absence of a zero pressure reading during the fuel slosh event; and
indicating the second grade vent valve is stuck open in response to the zero pressure reading during the fuel slosh event.

6. The method of claim 1, further comprising:
indicating the first grade vent valve is stuck closed in response to the pressure increasing and then decreasing during the fuel slosh event; and
indicating the first grade vent valve is functioning as desired or expected in response to the pressure remaining substantially constant during the fuel slosh event.

7. The method of claim 1, wherein the first grade vent valve is submerged in fuel throughout the fuel slosh event when diagnosing the second grade vent valve; and
wherein the first grade vent valve becomes transiently unsubmerged and then resubmerged in fuel during the fuel slosh event when diagnosing the first grade vent valve.

8. The method of claim 1, wherein the second grade vent valve becomes transiently submerged in liquid fuel during the fuel slosh event when diagnosing the first grade vent valve and the second grade vent valve.

9. The method of claim 1, wherein predicting the upcoming fuel slosh event is a function of an orientation of the fuel tank with respect to the vehicle.

10. The method of claim 1, wherein predicting the upcoming fuel slosh event is based on one or more of information retrieved from an onboard navigation system, information provided as a result of route-learning methodology, information retrieved from a smart traffic system, and information related to driving patterns of nearby vehicles as retrieved via vehicle-to-vehicle communications.

11. The method of claim 1, wherein sealing the fuel system within the threshold duration of the upcoming fuel slosh event further comprises:
establishing a predetermined negative pressure with respect to atmospheric pressure in the fuel system.

12. The method of claim 1, further comprising:
in response to an indication of degradation of either the first grade vent valve or the second grade vent valve, taking mitigating action that includes providing requests to either a vehicle operator or an autonomous control system of the vehicle to avoid specified parking situations which may lead to one or more of undesirable pressure increases in the fuel system and/or liquid fuel entering into one or more lines that couple the fuel system to an evaporative emissions control system.

13. A method comprising:
predicting in advance a fuel slosh event in a fuel tank positioned in a fuel system of a vehicle, the fuel slosh event inferred to result in a fuel wave traveling towards a second, higher elevation grade vent valve with respect to a maximal height of the fuel tank and away from a first, lower elevation grade vent valve, and then traveling away from the second grade vent valve and towards the first grade vent valve;
trapping a predetermined negative pressure with respect to atmospheric pressure in the fuel system within a threshold duration of the fuel slosh event occurring;
monitoring a pressure in the fuel system during the fuel slosh event; and
indicating, based on the pressure monitored in the fuel system during the fuel slosh event, whether the second grade vent valve is degraded when a fuel level in the fuel tank is greater than or equal to a first fuel level threshold, or whether the first grade vent valve is degraded when the fuel level in the fuel tank is less than the first fuel level threshold but greater than a second fuel level threshold.

14. The method of claim 13, wherein under conditions where the fuel level in the fuel tank is greater than or equal to the first fuel level threshold, the first grade vent valve remains submerged in fuel throughout the fuel slosh event; and
wherein under conditions where the fuel level in the fuel tank is less than the first fuel level threshold but greater than the second fuel level threshold, the first grade vent valve becomes transiently unsubmerged in fuel during the fuel slosh event.

15. The method of claim 13, wherein indicating degradation of the second grade vent valve includes indicating the second grade vent valve is stuck closed in response to the pressure remaining substantially constant during the fuel slosh event, or indicating the second grade vent valve is stuck open in response to a zero pressure reading during the fuel slosh event.

16. The method of claim 13, wherein indicating degradation of the first grade vent valve includes indicating the first grade vent valve is stuck closed in response to the pressure increasing and then decreasing during the fuel slosh event.

17. The method of claim 13, further comprising:
in response to an indication of degradation of either the first grade vent valve or the second grade vent valve, monitoring one or more of a vehicle pitch angle, vehicle yaw angle, and vehicle roll angle during a parking condition or driving condition of the vehicle; and
providing a request to avoid situations where fuel tank pressure relief is compromised due to the degraded first grade vent valve or the second grade vent valve or that there is a likelihood of liquid fuel entering into one or more lines that couple the fuel system to an evaporative emissions control system of the vehicle.

18. A system for a vehicle, comprising:
a fuel tank positioned in a fuel system of the vehicle, the fuel tank including a first grade vent valve positioned at a lower height with respect to a maximal height of the fuel tank than a second grade vent valve, and further including a fuel level sensor for monitoring a fuel level in the fuel tank and a fuel tank pressure transducer; and
a controller with computer readable instructions stored on non-transitory memory that when executed, cause the controller to:
receive an indication of a predicted upcoming fuel slosh event inferred to result in a fuel wave traveling in a direction towards the second grade vent valve and then away from the second grade vent valve and towards the first grade vent valve;
establish a predetermined negative pressure with respect to atmospheric pressure in the fuel system within a threshold duration of the fuel slosh event occurring; and
diagnose the first grade vent valve in response to the fuel level in the fuel tank being below a first fuel level threshold but greater than a second fuel level threshold and diagnose the second grade vent valve in response to the fuel level in the fuel tank being greater than or equal to the first fuel level threshold, where diagnosing either the first grade vent valve or the second grade vent valve is based on a pressure in the fuel system monitored via the fuel tank pressure transducer during the fuel slosh event.

19. The system of claim 18, further comprising:
an onboard navigation system; and
wherein the controller receives the prediction of the upcoming fuel slosh event based on information retrieved from the onboard navigation system related to a vehicle maneuver inferred to result in the fuel wave traveling in the direction towards the second grade vent valve and then away from the second grade vent valve and towards the first grade vent valve.

20. The system of claim 18, further comprising:
a device for wireless communication between the controller of the vehicle and one or more smart traffic lights; and
wherein the controller receives the prediction of the upcoming fuel slosh event based on information retrieved from the one or more smart traffic lights.

* * * * *